US012794162B2

(12) United States Patent
Schneider

(10) Patent No.: US 12,794,162 B2
(45) Date of Patent: Nov. 10, 2026

(54) CANTED COIL COUPLER

(71) Applicant: Ennovi Industries, Inc., East Providence, RI (US)

(72) Inventor: Richard Schneider, Livonia, MI (US)

(73) Assignee: ENNOVI INDUSTRIES, INC., East Providence, RI (US)

( * ) Notice: Subject to any disclaimer, the term of this patent is extended or adjusted under 35 U.S.C. 154(b) by 378 days.

(21) Appl. No.: 18/688,029

(22) PCT Filed: Sep. 19, 2022

(86) PCT No.: PCT/US2022/043984
§ 371 (c)(1),
(2) Date: Feb. 29, 2024

(87) PCT Pub. No.: WO2023/049072
PCT Pub. Date: Mar. 30, 2023

(65) Prior Publication Data

US 2024/0372284 A1 Nov. 7, 2024

Related U.S. Application Data

(60) Provisional application No. 63/287,131, filed on Dec. 8, 2021, provisional application No. 63/247,119, filed on Sep. 22, 2021.

(51) Int. Cl.
*H01R 13/24* (2006.01)
*H01R 12/72* (2011.01)
(Continued)

(52) U.S. Cl.
CPC ........... *H01R 13/24* (2013.01); *H01R 12/721* (2013.01); *H01R 13/424* (2013.01); *H01R 25/162* (2013.01)

(58) Field of Classification Search
CPC .... H01R 13/24; H01R 12/721; H01R 13/424; H01R 25/162
(Continued)

(56) References Cited

U.S. PATENT DOCUMENTS 2,014,729 A * 9/1935 Harrison .................. H02G 5/04 191/23 A
2,263,681 A * 11/1941 Hart, Jr. ................. D01D 10/06 34/105
(Continued)

FOREIGN PATENT DOCUMENTS

CN 204118662 U 1/2015
CN 103038949 B 4/2015
EP 0415052 A1 3/1991

OTHER PUBLICATIONS

Written Opinion of the International Searching Authority for PCT/US2022/043984 mailed Jan. 5, 2023.
(Continued)

*Primary Examiner* — Tulsidas C Patel
*Assistant Examiner* — Thomas K Quigley
(74) *Attorney, Agent, or Firm* — Paul Katterle; Cooper Legal Group, LLC

(57) ABSTRACT

A coupler for connecting a pair of power conductors. The coupler includes a first bracket and a second bracket that are arranged to define one or more chambers in-between. The second bracket has a trough formed therein for each chamber. A row of canted coil contacts is at least partially disposed in each trough and is secured to the second bracket. In each chamber, the row of canted coil contacts presses against a power conductor when it is inserted into the chamber.

18 Claims, 19 Drawing Sheets

(51) Int. Cl.
*H01R 13/424* (2006.01)
*H01R 25/16* (2006.01)

(58) Field of Classification Search
USPC ........ 439/121, 786, 788, 816, 817, 840, 841
See application file for complete search history.

(56) References Cited

U.S. PATENT DOCUMENTS

| | | | | | |
|---|---|---|---|---|---|
| 2,882,514 | A * | 4/1959 | Krantz | H01R 12/721 | 439/840 |
| 3,205,468 | A * | 9/1965 | Henschen | H01R 12/716 | 267/180 |
| 3,317,885 | A * | 5/1967 | Yost | H01R 12/721 | 439/631 |
| 3,383,647 | A * | 5/1968 | Duffield | H01R 13/33 | 439/840 |
| 3,513,434 | A * | 5/1970 | Zielke | H01R 4/4863 | 439/840 |
| 4,462,657 | A | 7/1984 | Snowdon | | |
| 4,838,815 | A * | 6/1989 | Tajima | H01R 13/33 | 439/840 |
| 4,966,564 | A * | 10/1990 | Foote | A61N 1/3752 | 439/840 |
| 4,969,824 | A * | 11/1990 | Casciotti | H01R 12/62 | 439/62 |
| 5,007,842 | A * | 4/1991 | Deak | H01R 12/714 | 439/493 |
| 5,026,290 | A * | 6/1991 | Dery | H01R 12/52 | 439/494 |
| 5,030,109 | A * | 7/1991 | Dery | H01R 12/714 | 439/840 |
| 5,035,628 | A * | 7/1991 | Casciotti | H01R 13/2414 | 439/591 |
| 5,139,276 | A * | 8/1992 | Balsells | F16J 15/0893 | 267/1.5 |
| 5,171,154 | A | 12/1992 | Casciotti | | |
| 5,273,438 | A * | 12/1993 | Bradley | G01R 1/07307 | 439/591 |
| 5,421,751 | A * | 6/1995 | Bennett | H02B 1/21 | 439/786 |
| 5,476,398 | A * | 12/1995 | de Givry | H01R 12/716 | 439/841 |
| 6,416,330 | B1 * | 7/2002 | Yatskov | H01R 12/7088 | 439/840 |
| 6,666,690 | B2 * | 12/2003 | Ishizuka | H01R 13/2421 | 439/840 |
| 6,835,084 | B2 | 12/2004 | Poon | | |
| 7,128,620 | B2 | 10/2006 | Maura | | |
| 7,553,169 | B2 * | 6/2009 | Kasai | H05K 1/0263 | 439/949 |
| 7,704,107 | B1 * | 4/2010 | Desmond | H01R 4/4863 | 439/840 |
| 7,799,991 | B1 * | 9/2010 | Advey | H01R 13/5213 | 174/67 |
| 7,819,681 | B1 * | 10/2010 | Rodrigues | H02G 5/007 | 174/88 B |
| 8,033,850 | B2 * | 10/2011 | O'Leary | H02G 5/007 | 174/88 B |
| 8,336,864 | B2 | 12/2012 | Noh | | |
| 8,342,893 | B2 * | 1/2013 | Glick | H01R 13/187 | 439/840 |
| 8,383,934 | B2 * | 2/2013 | Asao | H02G 3/16 | 174/549 |
| 8,764,489 | B2 * | 7/2014 | Blakborn | H01R 13/187 | 439/626 |
| 8,795,005 | B2 * | 8/2014 | Blakborn | H01R 13/113 | 439/788 |
| 8,844,126 | B2 | 9/2014 | Frederick | | |
| 10,263,368 | B2 | 4/2019 | Young | | |
| 10,310,198 | B1 * | 6/2019 | Yatskov | G02B 6/4261 | |
| 10,622,743 | B2 * | 4/2020 | Kimura | H01R 13/518 | |
| 10,770,817 | B2 * | 9/2020 | Kimura | H01R 13/33 | |
| 10,770,848 | B2 * | 9/2020 | Mastrovito | H01R 13/187 | |
| 10,840,628 | B2 * | 11/2020 | Kato | H01R 13/42 | |
| 11,631,944 | B2 * | 4/2023 | Lybrand | H01R 4/245 | 439/394 |
| 11,699,887 | B2 | 7/2023 | Jin | | |
| 11,749,926 | B2 * | 9/2023 | Jung | H01R 13/187 | 439/889 |
| 11,777,254 | B2 * | 10/2023 | Schlegel | F16B 21/073 | 439/345 |
| 12,319,163 | B2 * | 6/2025 | Schroth | H02G 3/32 | |
| 2003/0157846 | A1 * | 8/2003 | Poon | H01R 13/03 | 439/840 |
| 2009/0149053 | A1 * | 6/2009 | Chansrivong | H01R 13/533 | 439/349 |
| 2010/0279558 | A1 * | 11/2010 | Leon | H01R 13/187 | 439/817 |
| 2011/0124245 | A1 * | 5/2011 | Fujita | H01R 13/2421 | 439/840 |
| 2011/0263164 | A1 * | 10/2011 | Lenhert | H01R 13/33 | 267/167 |
| 2012/0003843 | A1 * | 1/2012 | Hashiguchi | H01R 13/113 | 439/12 |
| 2012/0003883 | A1 * | 1/2012 | Pavlovic | H01R 13/187 | 439/840 |
| 2012/0208407 | A1 * | 8/2012 | Leon | H01R 13/17 | 439/817 |
| 2012/0315778 | A1 * | 12/2012 | Leifer | H01R 25/142 | 439/253 |
| 2013/0130556 | A1 | 5/2013 | Blakborn | | |
| 2013/0330981 | A1 * | 12/2013 | Blakborn | H01R 13/113 | 439/788 |
| 2014/0099806 | A1 | 4/2014 | Ehlen | | |
| 2014/0295688 | A1 * | 10/2014 | Deininger | A61N 1/3754 | 439/271 |
| 2014/0378008 | A1 * | 12/2014 | Young | H01R 12/716 | 439/816 |
| 2015/0018909 | A1 * | 1/2015 | Rebentisch | H01R 43/16 | 607/116 |
| 2015/0118916 | A1 * | 4/2015 | Hofmann | H01R 13/2421 | 29/881 |
| 2015/0133003 | A1 * | 5/2015 | Ebisawa | H01R 13/639 | 439/817 |
| 2015/0364878 | A1 * | 12/2015 | Orris | H01R 13/113 | 439/55 |
| 2017/0062955 | A1 | 3/2017 | Marsh | | |
| 2019/0280471 | A1 * | 9/2019 | Schell | H02G 5/025 | |
| 2019/0288467 | A1 | 9/2019 | Mastrovito | | |
| 2020/0280144 | A1 | 9/2020 | Parrish | | |
| 2023/0131568 | A1 * | 4/2023 | Pan | H01R 9/28 | 439/512 |
| 2023/0141760 | A1 * | 5/2023 | Schroth | H02G 3/03 | 361/704 |
| 2023/0261333 | A1 * | 8/2023 | Fukushima | H01M 50/519 | 439/67 |
| 2023/0335961 | A1 | 10/2023 | Schneider | | |
| 2025/0202175 | A1 * | 6/2025 | Robertson | H01R 4/30 | |

OTHER PUBLICATIONS

International Search Report for PCT/US2022/043984 mailed Jan. 5, 2023.

European Search Report from Corresponding European Patent Application No. 22873461.2, dated Nov. 29, 2024.

* cited by examiner

CANTED COIL COUPLER

CROSS-REFERENCE TO RELATED APPLICATION(S)

This application is the U.S. national phase of PCT Application No. PCT/US2022/043984 filed on 19 Sep. 2022, which claims the benefit of priority under 35 U.S.C. § 119(e) to U.S. Provisional Patent Application No. 63/247,119 filed on 22 Sep. 2021, and U.S. Provisional Patent Application No. 63/287,131 filed on 8 Dec. 2021, which are all herein incorporated by reference.

TECHNICAL FIELD

This disclosure relates generally to connectors for fastening together two parts to convey power.

BACKGROUND

Bus bars and other power conductors are commonly used to provide power to electrical and electronic devices, such as printed circuit boards (PCBs). Conventionally, a power conductor, such as a bus bar, is composed of a conductive metal, such as copper or a copper alloy, and is relatively wide and thick to better conduct electric current. Due to the composition, thickness and configuration of a typical power conductor, it is typically difficult to securely connect a power conductor to an electrical device, such as a printed circuit board (PCB) or to another power conductor. Typically, connections are made using large, complicated connection assemblies that are difficult to use. As such, it would be desirable to have a coupler that is constructed to facilely connect together power conductors, or to connect together a power conductor and an electrical device, such as a PCB. The present disclosure is directed to such a coupler and a power connector assembly using the same to make power connections.

SUMMARY

In accordance with the disclosure, a coupler is provided for connecting to at least one power conductor. The coupler includes a first bracket and a second bracket that are arranged to define a chamber in-between. The second bracket has a trough formed therein that extends across at least a portion of the width of the chamber. A row of canted coil contacts is secured to the second bracket so as to be partially disposed in the trough and project outwardly therefrom to contact the at least one power conductor when it is inserted into the chamber.

Also provided in accordance with the disclosure is a power connector assembly that includes the above-described coupler, as well as first and second power conductors. The first power conductor is at least partially disposed in the chamber between the first and second brackets and contacts the row of canted coil contacts. The second power conductor is electrically connected to the first power conductor through the coupler.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
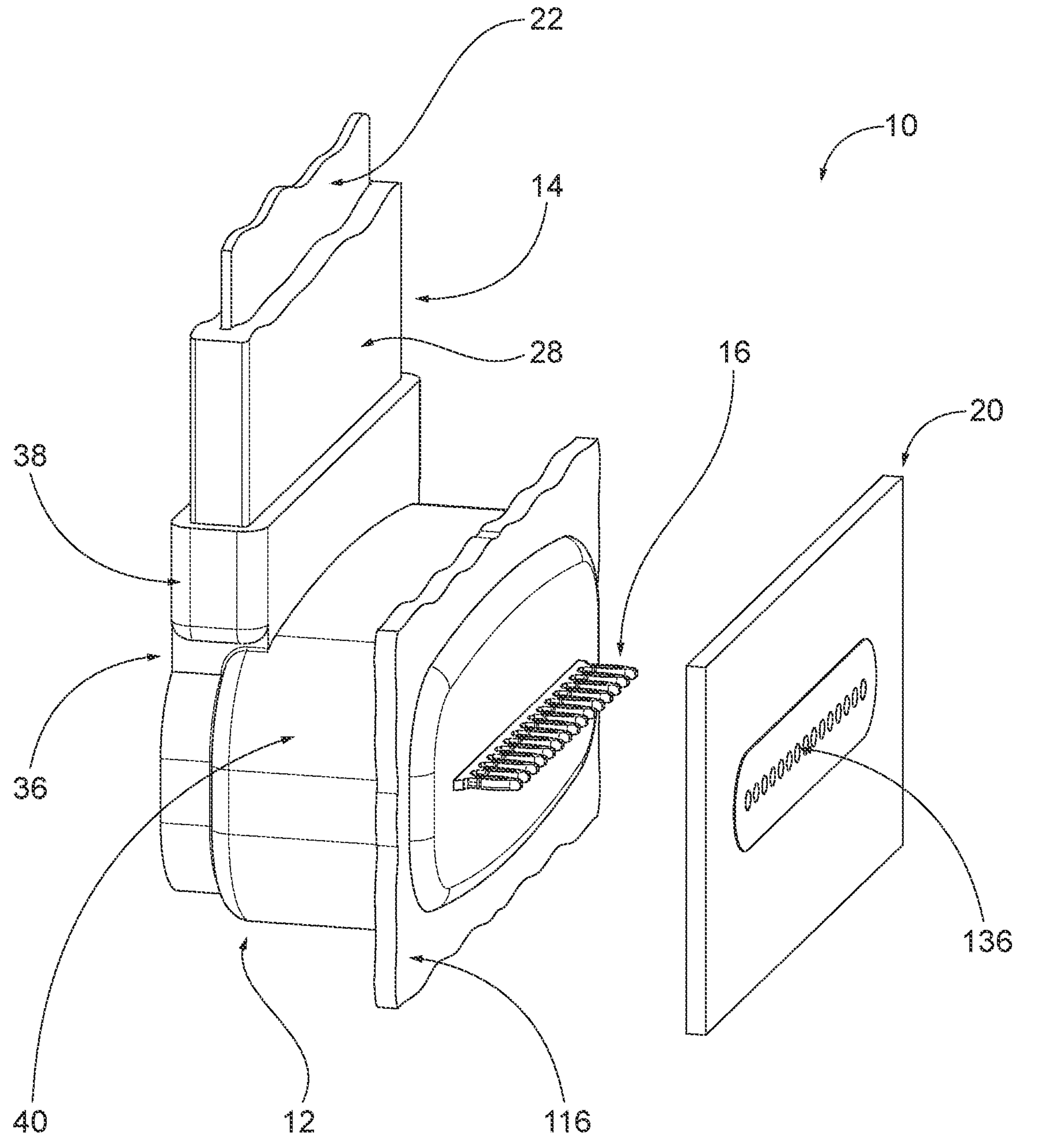
FIG. 1 shows a side perspective view of a power connector assembly spaced from a printed circuit board.

It should be noted that in the detailed description that follows, identical components have the same reference numerals, regardless of whether they are shown in different embodiments of the present disclosure. It should also be noted that for purposes of clarity and conciseness, the drawings may not necessarily be to scale and certain features of the disclosure may be shown in somewhat schematic form.

Spatially relative terms, such as "top", "bottom", "lower", "above", "upper", and the like, are used herein merely for ease of description to describe one element or feature's relationship to another element(s) or feature(s) as they are illustrated in (a) drawing figure(s) being referred to. It will be understood that the spatially relative terms are not meant to be limiting and are intended to encompass different orientations of the device in use or operation in addition to the orientation depicted in the drawings.

Referring now to FIG. 1, there is shown a power connector assembly 10 constructed in accordance with an embodiment of this disclosure. The power connector assembly 10 includes a connector 12 secured to a cable 14. The connector 12 may be used with a connector plate or blade 16 to make a power connection to a printed circuit board (PCB) 20 or other type of circuit construction, as described more fully below.

Figure 2:
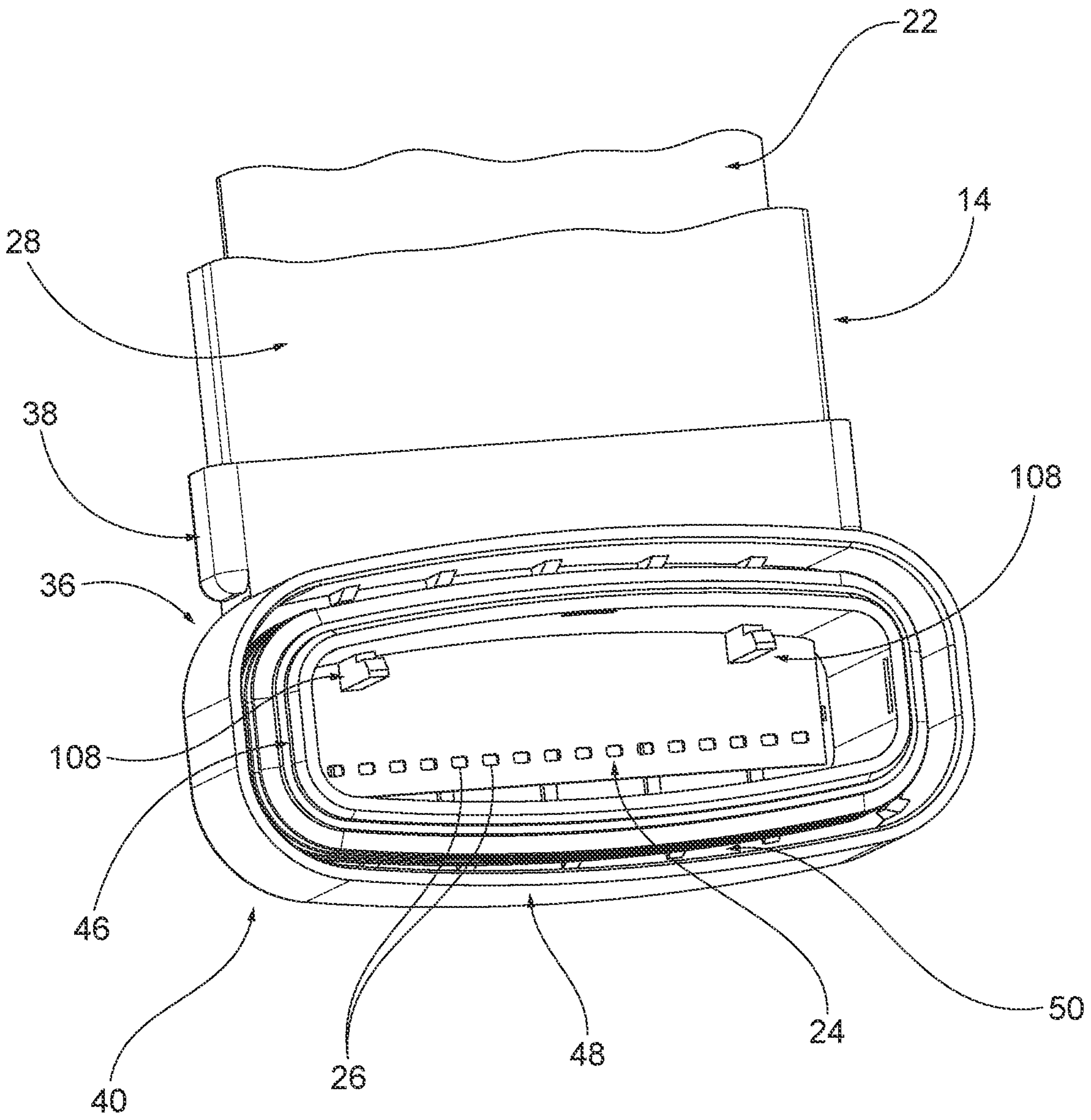
FIG. 2 shows a front perspective view of the power connector assembly of FIG. 1 with components removed to show the interior of a housing of the power connector assembly.
Figure 5:
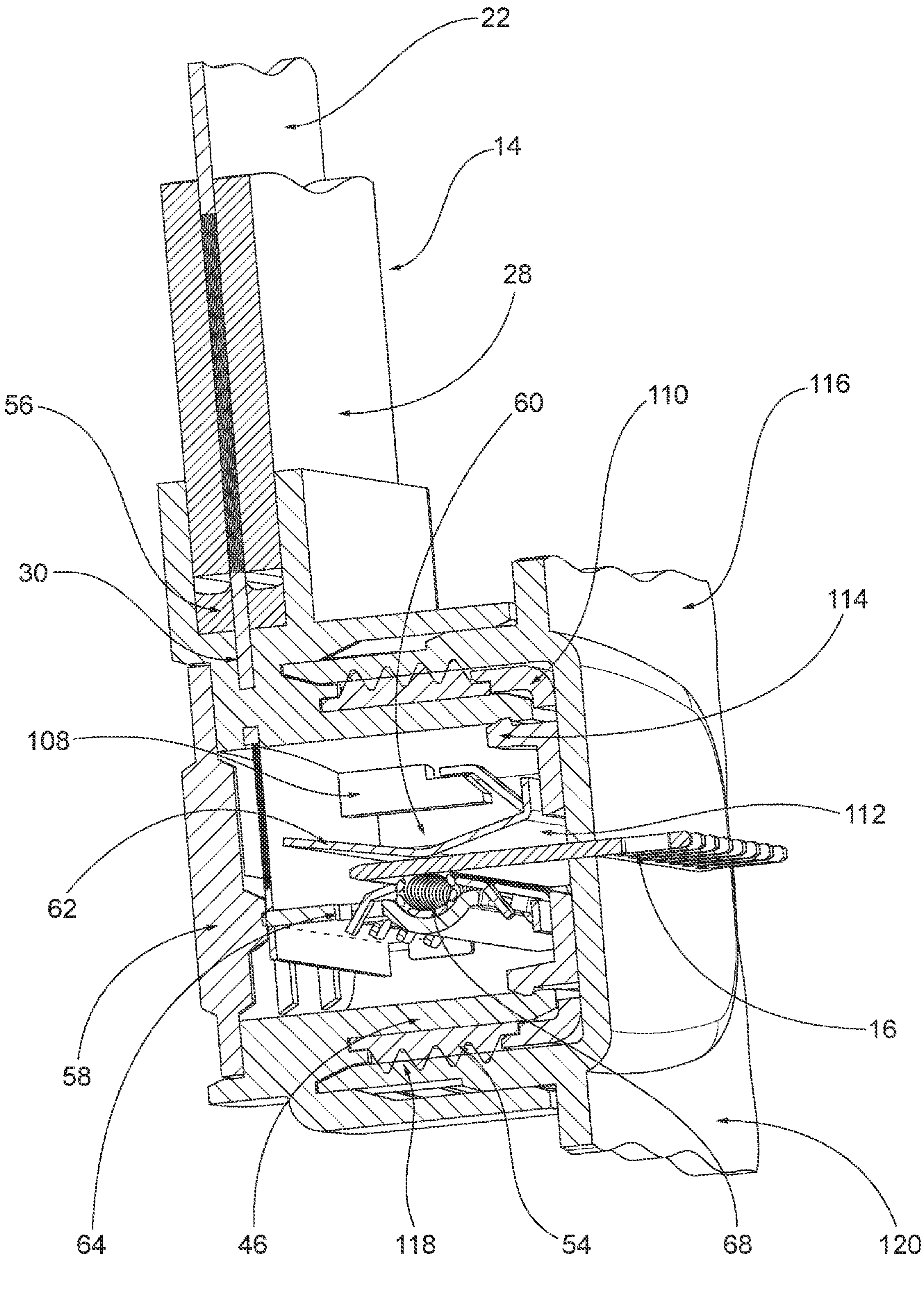
FIG. 5 shows a perspective sectional view of the power connector assembly of FIG. 1.

Referring now also to FIGS. 2 and 5, the cable 14 includes a metal conductor 22 formed from copper, a copper alloy or another electrically conductive metal. The conductor 22 is connected by another connector and/or cable (not shown) to a source of power. The conductor 22 may have multiple segments having different constructions. For example, the conductor may have a distal segment with opposing planar surfaces joined to an inner segment constructed from braided cable or thin laminated foils that provide strain relief to the connector 12 when a distal portion of the cable 14 experiences large movements. At a first end, the conductor 22 has a connection portion 24 that electrically connects to a lower bracket 64 of the connector 12, as described below. The connection portion 24 may be thinner than the rest of the conductor 22 and has a linear series of spaced apart holes 26 extending therethrough. A sheath or jacket 28 encloses the conductor 22, except for the connection portion 24 and an adjacent, clamped portion 30 of the conductor 22. The clamped portion 30 is firmly held by a housing 36 of the connector 12. The jacket 28 may be formed from flexible or semi-rigid plastic.

The connector 12 comprises the housing 36, which may be formed from plastic, such as a rigid and/or a semi-rigid plastic. The housing 36 includes a sleeve portion 38 joined to a head portion 40 with front and rear openings. The head portion 40 includes a continuous inner wall 46 that is spaced from a continuous outer wall 48 so as to define a channel 50 in-between. The inner and outer walls 46, 48 and the channel 50 may be oval-shaped. A sleeve gasket 54 (shown in FIG. 5) is disposed around the inner wall 46 and is positioned inside the channel 50. The jacket 28 of the cable 14 extends into the sleeve portion 38 of the housing 38 and may abut or be closely spaced from a cable gasket 56 disposed therein. The clamped portion 30 of the conductor 22 extends through the gasket 56 and into the head portion 40 of the housing 36 so as to position most of the connection portion 24 inside the inner wall 46, toward the rear opening, which may be closed by a removable rear plate 58. The sleeve gasket 54 and the cable gasket 56 may each be comprised of silicone rubber or another type of water-resistant elastomer and help prevent water from entering the head portion 40 of the housing 36.

Figure 3:
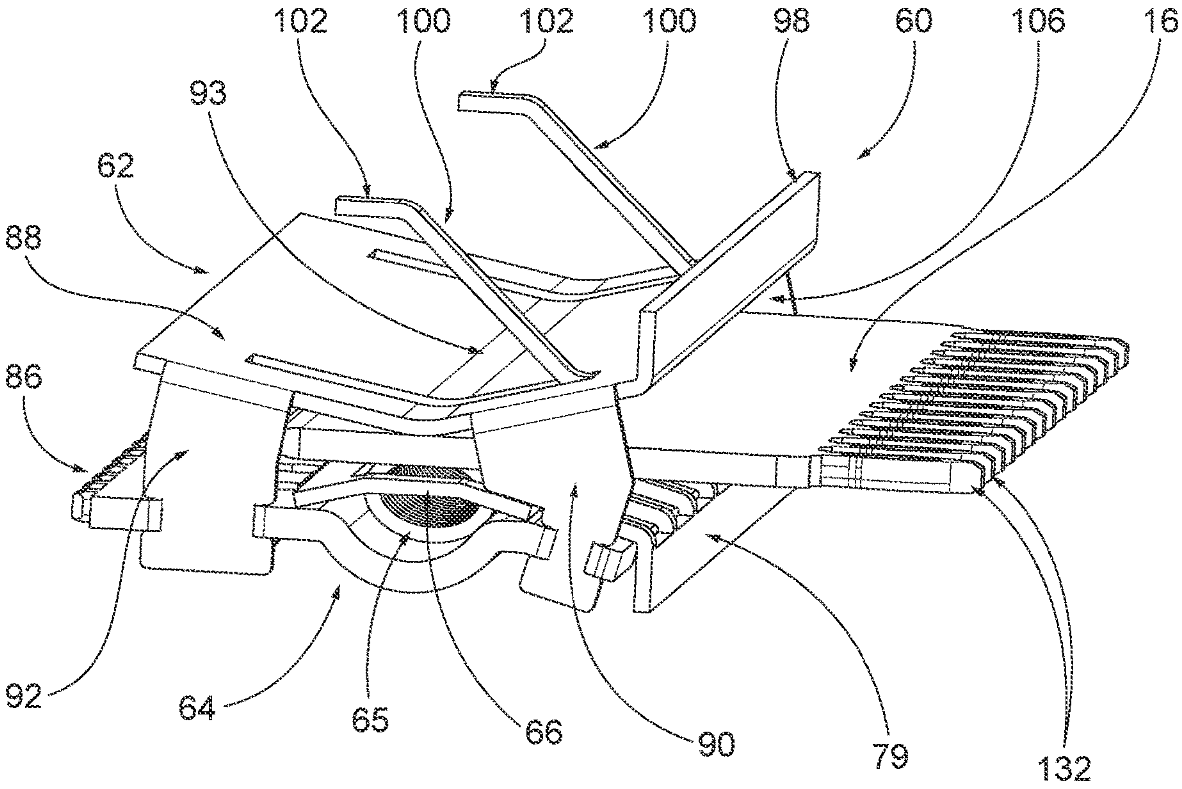
FIG. 3 shows a side perspective view of a coupler of the power connector assembly of FIG. 1.
Figure 4:
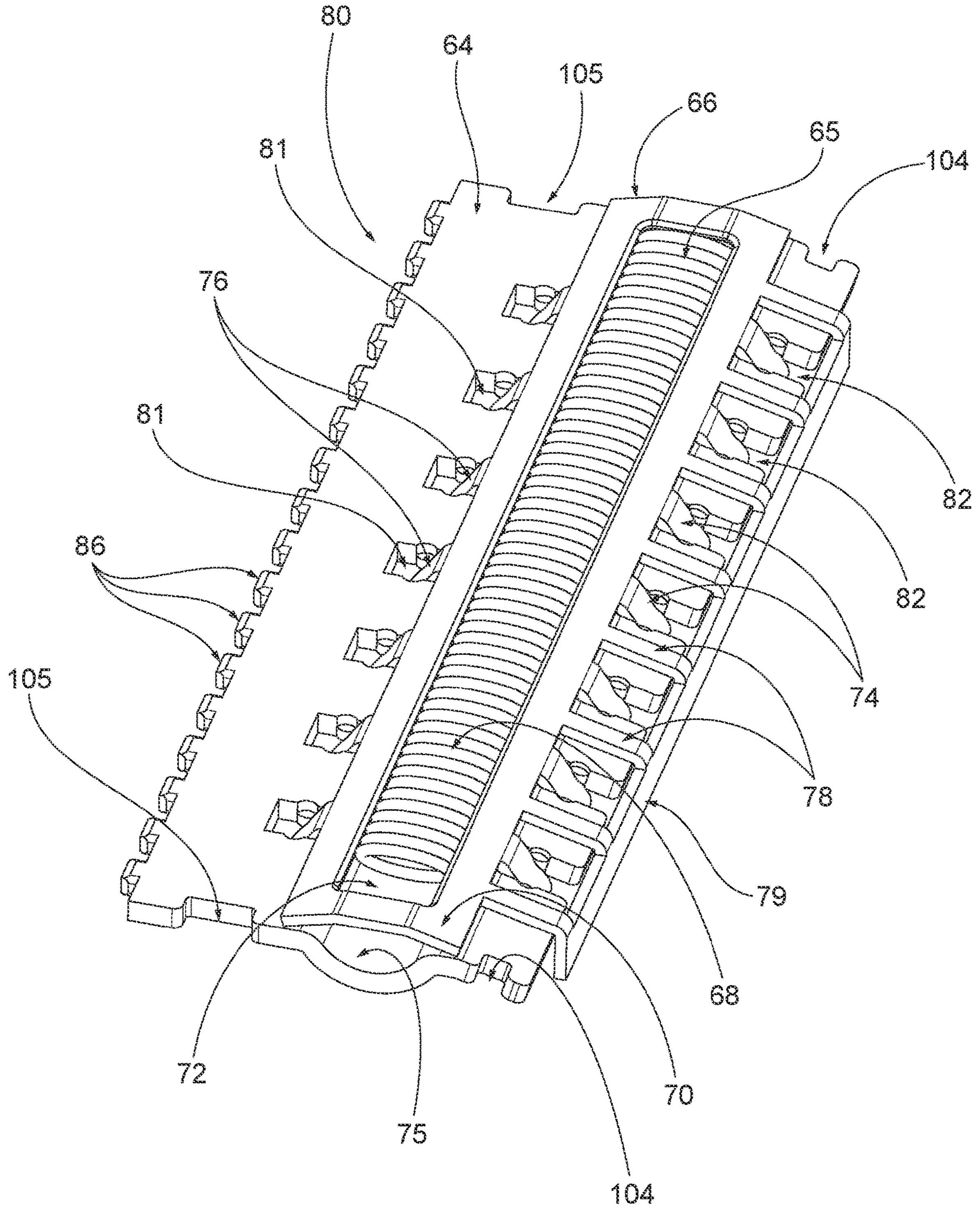
FIG. 4 shows a top perspective view of a contact assembly of the coupler of FIG. 3.

Referring now also to FIGS. 3 and 4, a coupler 60 is mounted inside the housing 36 and is positioned inside the inner wall 46. The coupler 60 includes upper and lower brackets 62, 64, a contact row 65 and a holding frame 66, all of which are formed from a conductive metal, such as copper, a copper alloy or heat-treated steel or other structural conductive metal. The steel may be provided with a zinc chromate, nickel or other protective finish. Likewise, the copper may be treated with nickel, tin, silver or some other protective finish. In some embodiments, the upper bracket 62 and the holding frame 66 may be formed from phosphor bronze, while the lower bracket 64 is formed from copper. Phosphor bronze is an alloy comprising copper, tin and phosphorous.

The contact row 65 is elongated and comprises a plurality of coil contacts 68. The contact row 65 may be a single unitary coil having a series of adjacent turns or loops, each of which is a coil contact 68. Alternately, the contact row 65 may include a plurality of such unitary coils. The coil contacts 68 are formed from copper or, more preferably, a high conductivity, high temperature copper alloy, such as C18080, which is an alloy of copper, chromium, silicon, titanium, silver and iron. Another suitable copper alloy is C151, which is an alloy of copper and zirconium. The coil contacts 68 may be plated with silver. The contact row 65 is pre-loaded and canted in an axial direction.

The contact row 65 is mounted in the holding frame 66. The holding frame 66 includes a body 70 having a holding slot 72 formed therein. Front or first fingers 74 are joined to a front edge of the body 70 and slope downwardly therefrom. Rear or second fingers 76 are joined to a rear edge of the body 70 and slope downwardly therefrom. The front fingers 74 are interleaved with spars 78 that are also joined to the front edge of the body 70 and extend outwardly therefrom. The spars 78 are joined to an outrigger plate or flange 79. The coil contacts 68 are trapped within the holding slot 72 so as to be secured within the coupler 60.

The holding frame 66, with the coil contacts 68 mounted thereto, is disposed over, and secured to, the lower bracket 64 to thereby form a contact assembly 80. Bottom portions of the coil contacts 68 are disposed in a depression or trough 75 that extends across the width of the lower bracket 64 and has an arcuate cross-section. The surface inside the trough may be plated with silver. The holding slot 72 of the holding frame 66 is aligned over the trough 75 to permit the coil contacts 68 to be disposed in both the holding slot 72 and the trough 75. The rear fingers 76 of the holding frame 66 are secured in rear slots 81 of the lower bracket 64, while the front fingers 74 are secured in front slots 82 of the lower bracket 64. A front edge of the lower bracket 64 is trapped behind the outrigger flange 79. A rear edge of the lower bracket 64 is crenellated, i.e., has a series of teeth 86 formed therein. The teeth 86 are secured in the holes 26 of the connection portion 24 of the conductor 22 to electrically and mechanically connect the conductor 22 to the lower bracket 64.

The upper bracket 62 may be a unitary or monolithic structure formed of a conductive metal. The upper bracket 62 includes a main body 88 having front legs 90 and rear legs 92 extending therefrom. The main body 88 has a center bend 93 located about midway along the length of the main body 88. A front flange 98 extends upwardly at the front of the main body 88. The front flange 98 is aligned with the outrigger flange 79. A pair of arms 100 are formed from the main body 88 through cuts made in the main body 88 by stamping or otherwise. The arms 100 extend upwardly and rearwardly and have outer portions 102 that are bent at about 45° to the rest of the arms 100, respectively. The arms 100 are resiliently bendable toward and away from the main body 88 and help center the coupler 60 in the head portion 40 of the housing 36.

The upper bracket 62 is secured to the contact assembly 80 by the front and rear legs 90, 92. More specifically, notched lower ends of the front legs 90 of the upper bracket 62 are held in front notches 104 of the lower bracket 64, respectively, and notched lower ends of the rear legs 92 of the upper bracket 62 are held in rear notches 105 of the lower bracket 64, respectively. The upper and lower brackets 62, 64 can be clinched or welded together. With the upper and lower brackets 62, 64 so connected, a chamber 106 is formed between the upper and lower brackets 62, 64. The holding frame 66 (with the coil contacts 68 mounted thereto) is disposed in the chamber 106. The chamber 106 is narrowed by the center bend 93 of the main body 88 where the coil contacts 68 are located. When the connector blade 16 is disposed in the chamber 106, the connector blade 16 is engaged by the center bend 93 of the main body 88 and the coil contacts 68.

While the holding frame 66 with the coil contacts 68 mounted thereto is shown and described as being mounted to the lower bracket 64, it should be appreciated that in other embodiments, the holding frame 66 with the coil contacts 68 may, instead, be mounted to the upper bracket 62. In still other embodiments, each of the upper and lower brackets 62, 64 may have a holding frame 66 with coil contacts 68 mounted thereto. In such embodiments, the coil contacts 68 engage both sides of the connector blade 16 or other bar disposed in the chamber between the upper and lower brackets 62, 64.

The coupler 60 is mounted inside the inner wall 46 of the head portion 40 such that the outer portions 102 of the arms 100 are held in slots formed between an inner surface of the inner wall 46 and L-shaped projections 108 extending therefrom. The coupler 60 is held inside the inner wall 46 by the arms 100, the connection portion 24 of the conductor 22 and a cap 110 connected to the head portion 40. Since the arms 100 are resiliently bendable and their outer portions 102 engage the housing 36, the arms 100 maintain the vertical (centered) position of the coupler 60 inside the head portion 40, while allowing some vertical movement of the coupler 60, such as during the insertion of the connector blade 16 into the coupler 60. The connection portion 24 of the conductor 22 prevents rearward movement of the coupler 60, while the cap 110 prevents forward movement of the coupler 60. The cap 110 has an entrance slot 112 formed therein, through which the connector blade 16 extends. The front flange 98 of the upper bracket 62 and the outrigger flange 79 of the holding frame 66 abut an interior surface of the cap 110, with the front flange 98 and the outrigger flange 79 being disposed on opposing sides of the entrance slot 112. The cap 110 is secured to the head portion 40 by snap-fit projections 114 that engage indentations in the inner wall 46, respectively.

A shroud 116 may be secured to the head portion 40, over the cap 110. As shown in FIG. 5, the shroud 116 includes an endless inner wall 118 joined to an inner surface of an outer wall 120. The inner wall 118 includes a series of ribs disposed around the circumference of the inner wall 118. A slot extends through the outer wall 120. The slot is disposed inside the inner wall 118. When the shroud 116 is secured to the head portion 40 of the housing 36, the slot is aligned with the entrance slot 112 in the cap 110. The shroud 116 is secured to the head portion 40 of the housing 36 by the inner wall 118 of the shroud 116, which is positioned inside the channel 50 and pressed between the sleeve gasket 54 and an inner surface of the outer wall 48 of the head portion 40. The ribs of the inner wall 118 of the shroud 116 engage and deform the sleeve gasket 54, which helps secure the shroud 116 between the sleeve gasket 54 and the outer wall 48 of the head portion 40 of the housing 36. The ribs help ensure uniform compression of the sleeve gasket 54.

While not shown, a latching mechanism may be provided that locks the shroud 116 to the connector 12. More specifically, the latching mechanism may secure the shroud 116 to the housing 36.

With reference now to FIGS. 1, 3 and 5, the connector blade 16 is a monolithic or unitary structure that is flat and has opposing planar surfaces. The connector blade 16 is formed from a conductive metal such as copper or a copper alloy and which may or may not be plated with another metal, such as silver, tin and/or nickel. The connector blade 16 has a tapered rear edge that facilitates insertion of the connector blade 16 into the chamber 106 of the coupler 60. A series of spaced-apart press-fit fasteners 132 extend from a front portion of the connector blade 16. The press-fit fasteners 132 may have an eye-of-the-needle (EON) construction, as shown. In this type of construction, an opening or piercing is formed in the fastener 132 so as to define a pair of beams that are resiliently movable toward and away from each other to provide a normal force against a PCB hole. Another type of construction that may be used for the press-fit fasteners 132 utilizes beams that are connected together by a web that permits the beams to roll inward to conform to the PCB hole. A particularly suitable web-type of construction that may be used for the press-fit fasteners 132 is shown in U.S. Patent Publication No. 20200280144 to Parrish, which is herein incorporated by reference. In this construction, each fastening section includes a pair of beams with a web joined in-between. The web has a center portion disposed between a pair of sloping ramp portions. A pair of holes may extend through the center portion.

The connector blade 16 may be mounted to the PCB 20 before or after the connector blade 16 is connected to the connector 12. The press-fit fasteners 132 are pressed into plated holes 136 of the PCB 20 so as to electrically and mechanically connect the connector blade 16 to the PCB 20, thereby electrically connecting the conductor 22 of the cable 14 to the PCB 20. The connector blade 16 is mounted to the connector 12 by inserting the rear edge 130 through the aligned slots 112 of the cap 110 and the shroud 116, respectively, and into the chamber 106 of the coupler 60. As the connector blade 16 enters the chamber 106, the connector blade 16 depresses the coil contacts 68. The coil contacts 68 and the main body 88 press against the opposing surfaces of the connector blade 16 to hold the connector blade 16 in the coupler 60 and establish an electrical connection between the connector blade 16 and the coupler 60.

It should be appreciated that in other embodiments, the connector blade 16 may not have press-fit fasteners 132. Instead, the connector blade 16 may be configured for surface mounting to one or more pads of the PCB 20. In another embodiment, the connector blade 16 may be replaced with a terminal end of a bus bar or other circuit construction. The bus bar may be connected to a coupler mounted to the PCB 20. A coupler that may be used is disclosed in U.S. Pat. No. 10,763,607, which is herein incorporated by reference. In still another embodiment, the connector blade 16 may be replaced with a bar that, along with the shroud 116, is part of a wire harness or flat-cable connector.

Figure 6:
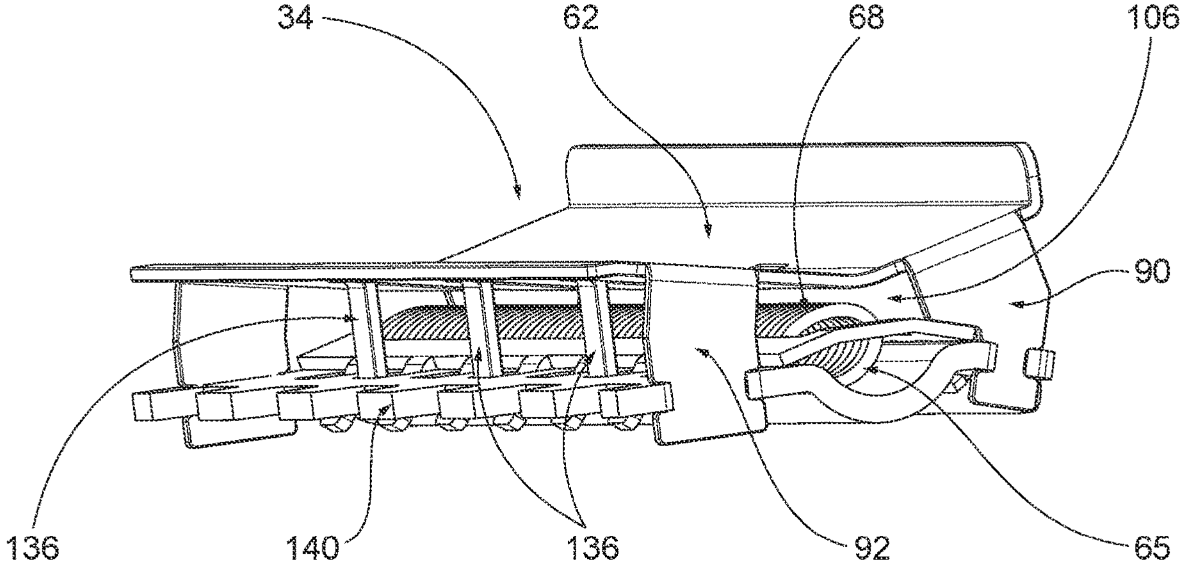
FIG. 6 shows a front side perspective view of a second coupler constructed in accordance with a second embodiment of the present disclosure.
Figure 7:
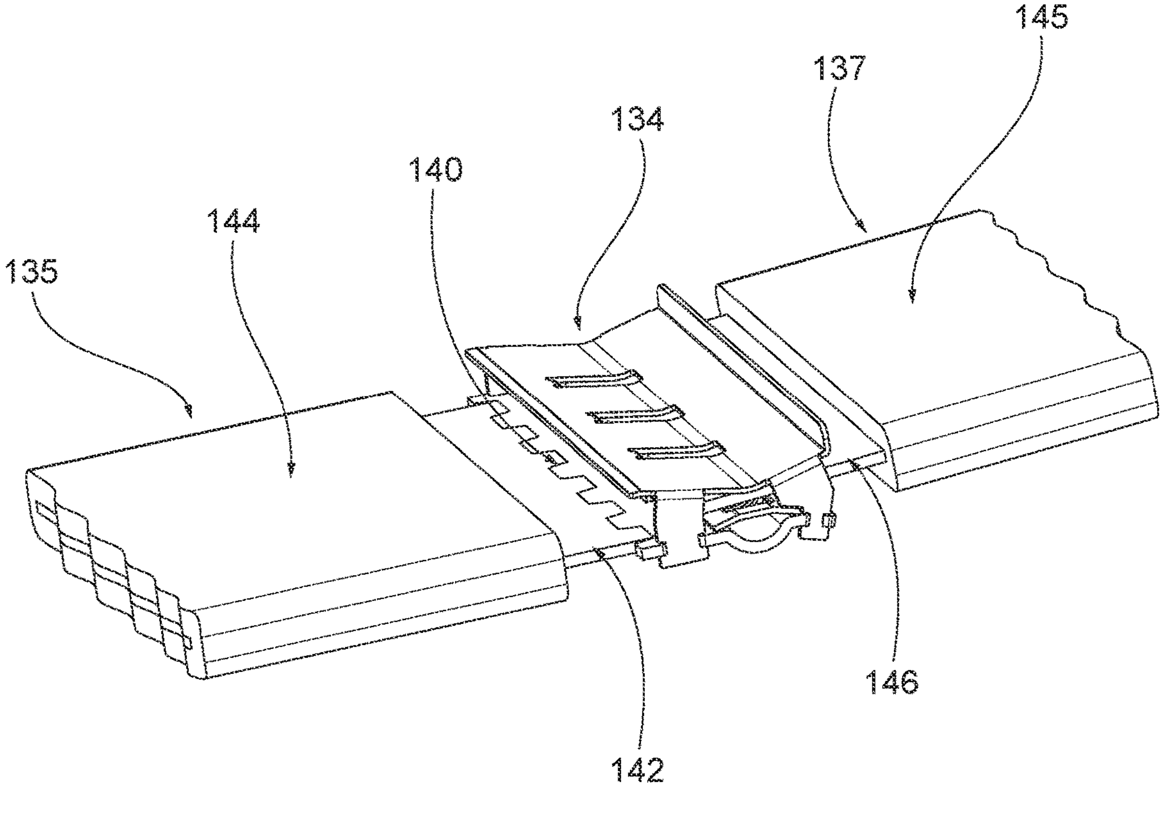
FIG. 7 shows a top side perspective view of the second coupler shown in FIG. 6, connecting together a pair of bus bars.
Figure 8:
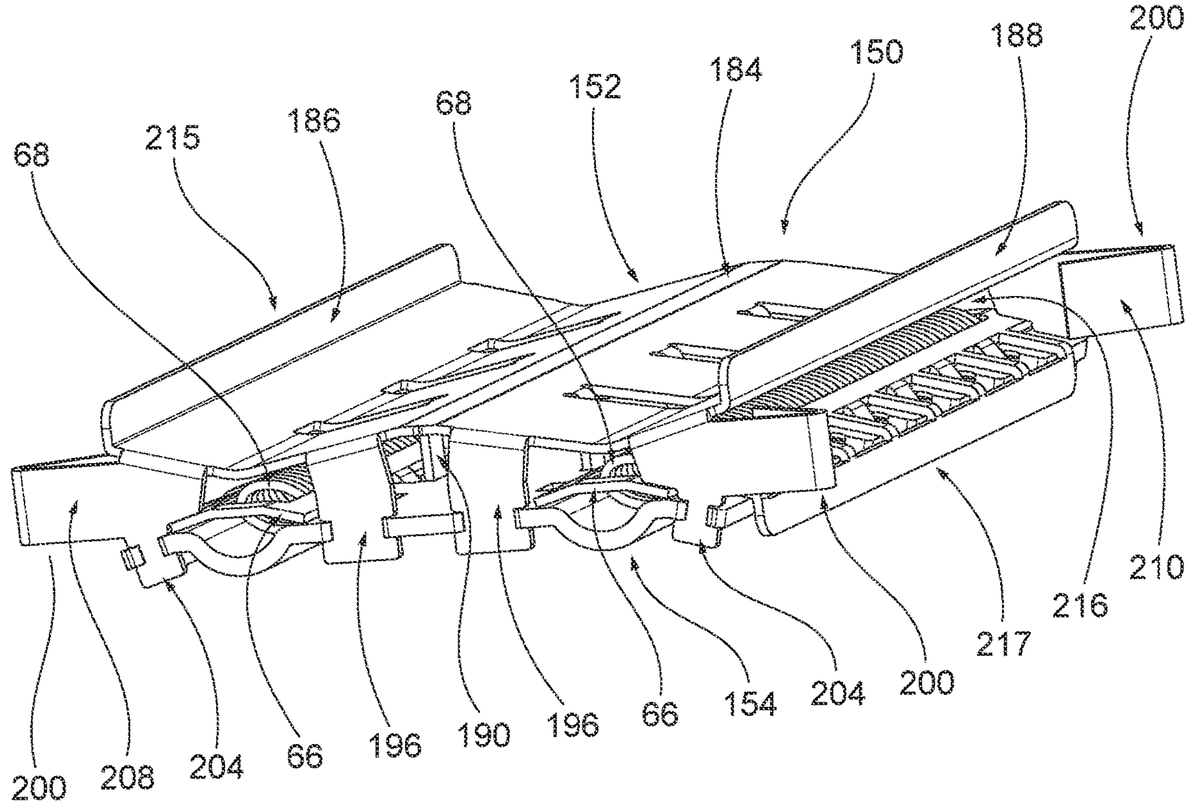
FIG. 8 shows a side perspective view of a third coupler constructed in accordance with a third embodiment of the present disclosure.
Figure 9:
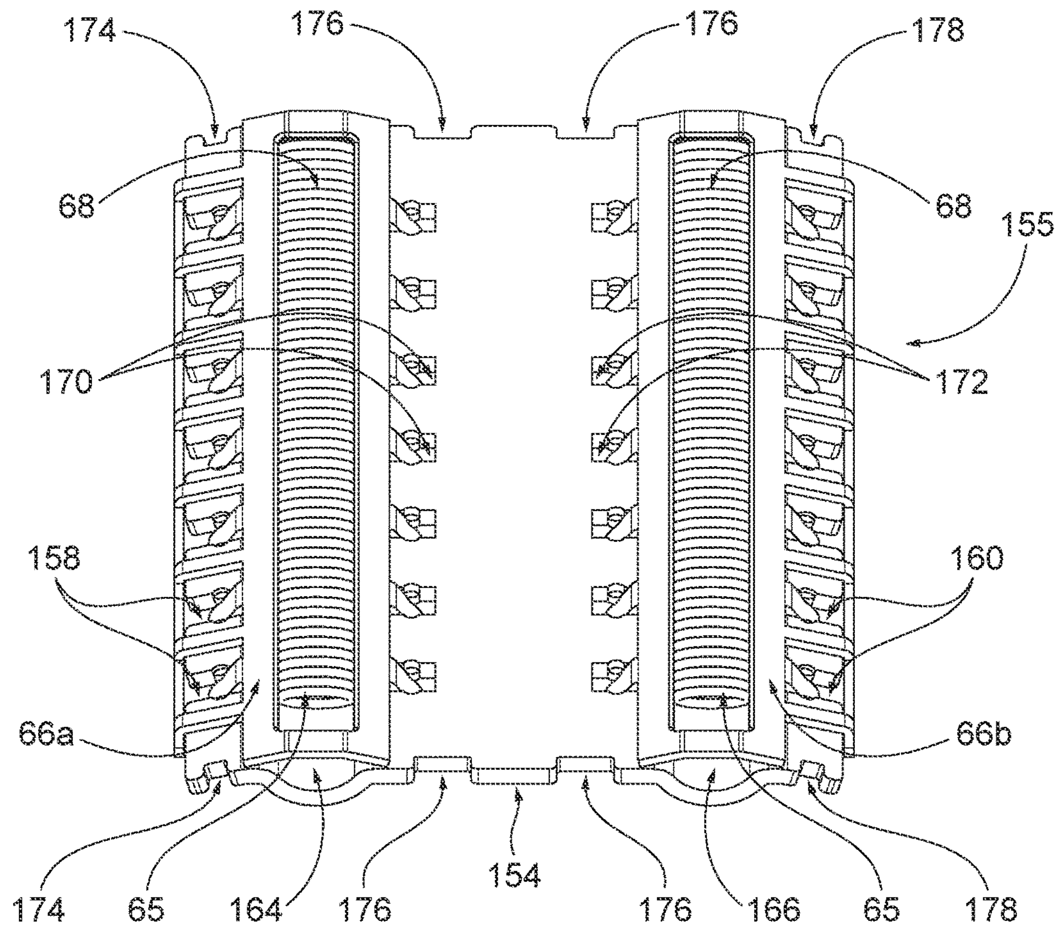
FIG. 9 shows a top perspective view of a contact assembly of the third coupler shown in FIG. 8.
Figure 10:
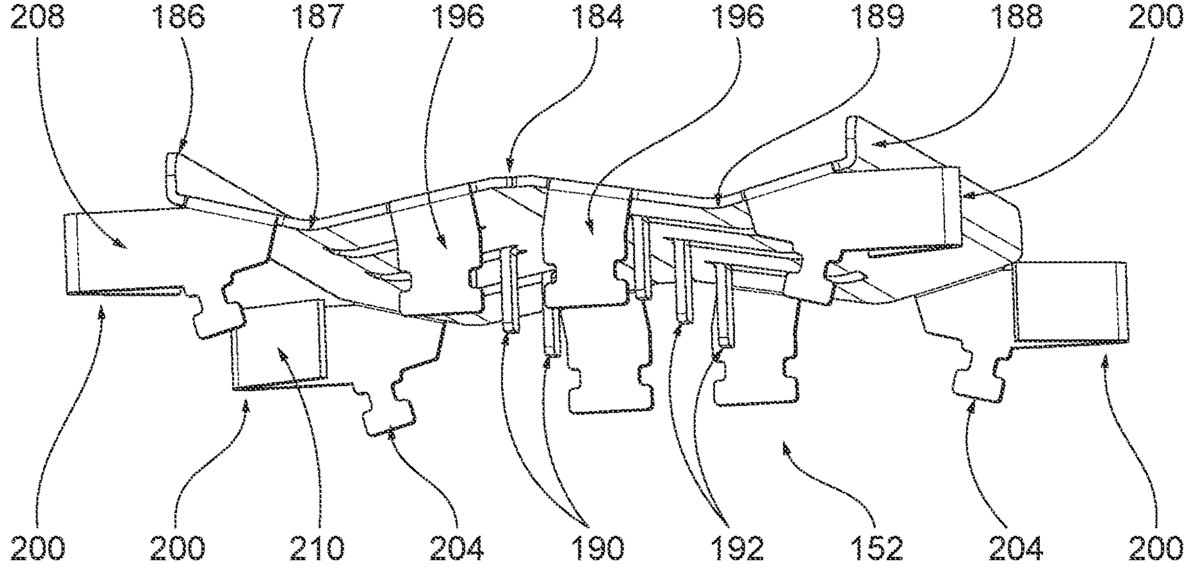
FIG. 10 shows a bottom side perspective view of an upper bracket of the third coupler shown in FIG. 8.

Referring now to FIGS. 6-7, there is shown a second coupler 134 constructed in accordance with a second embodiment of this disclosure. In FIG. 7, the second coupler 134 is shown connecting together first and second bus bars 135, 137. The second coupler 134 has the same construction as the coupler 60 described above, except for the differences described below.

The second coupler 134 does not have the arms 100. Instead, the second coupler 134 has posts 136 that extend downwardly from the upper bracket 62 and have ends received in the slots 80 of the lower bracket 64. The posts 136 are formed from the main body 88 through cuts made in the main body 88 by stamping or otherwise. The chamber 106 is inwardly delimited by the posts 136.

The lower bracket 64 may have teeth with the same configuration as the teeth 86, or the lower bracket 64 may, instead, have teeth 138 with a different configuration, as shown. The teeth 138 are wider than the teeth 86 and have wider gaps in-between. Teeth 140 with a corresponding configuration are formed in an exposed end of the first bus bar 135 that is to be connected to the second coupler 134. The teeth 140 of the first bus bar 135 are enmeshed with the teeth 138 of the lower bracket 64 to thereby form an edge-to-edge connection between the first bus bar 135 and the second coupler 134. The enmeshed teeth 138, 140 may be secured together by welding, such as laser welding, ultrasonic welding or resistance welding.

The first bus bar 135 includes a metallic conductor 142 having the end with the teeth 140. The conductor 142 is encased within an outer polymeric sheath 144. An end portion of the conductor 142 (which includes the teeth 140) is exposed, i.e., is not covered by the sheath 144. Similarly, the second bus bar 137 has a metallic conductor 146 encased within an outer polymeric sheath 145, except for an end portion which is exposed. The end portion of the conductor 146 has a tapered end for facilitating the insertion of the end portion into the chamber 106. When the exposed end portion of the conductor 146 is disposed in the chamber 106 of the second coupler 134, the tapered end is engagement with, or in close proximity to, the posts 136. In addition, the coil contacts 68 in the contact row 65 press against a planar surface of the exposed end portion of the conductor 146, thereby making an electrical connection therewith. The coil contacts 68 also press against an interior surface of the lower bracket 64 in the channel 50, thereby making an electrical connection therewith. Thus, the coil contacts 68 electrically connect the second bus bar 137 to the lower bracket 64, which is electrically connected to the first bus bar 135 via the enmeshed teeth 138, 140. In this manner, the first coupler 134 physically and electrically connects together the first and second bus bars 135, 137.

Although not shown, second couplers 134 may be used to connect together battery power packs of an inverter. For example, the power packs may be connected in parallel between a pair of conductors, each having a plurality of spaced-apart tabs projecting outward from a main strip or bar. The tabs of one conductor are aligned with opposing tabs of the other conductor. The tabs may each have teeth that are configured to be enmeshed with the teeth 138 of the lower bracket 64 of a second coupler 134. Each power pack has opposing ends with terminal blades extending therefrom, respectively. For each power pack, one of the terminal blades is mounted in the chamber 106 of a second coupler 134 and the other one of the terminal blades is mounted in the chamber 106 of another second coupler 134, with the teeth 138 of the second couplers 134 being enmeshed with the teeth of a pair of opposing tabs of the two conductors, respectively, thereby electrically and mechanically connecting the power pack between the two conductors. It should be appreciated that in another embodiment, end portions of the tabs may form the lower brackets of the second couplers 134, respectively. Of course, in this embodiment, the lower brackets will not have the teeth 138.

Referring now to FIGS. 8-12, there is shown a third coupler 150 constructed in accordance with a third embodiment of this disclosure. The third coupler 150 has first and second ends and includes a first or upper bracket 152 and a second or lower bracket 154, a pair of contact rows 65 and a pair of holding frames 66. The upper and lower brackets 152, 154 may each be a monolithic or unitary structure formed from a conductive metal, such as copper, a copper alloy or heat-treated steel or other structural conductive metal. The steel may be provided with a zinc chromate, nickel or other protective finish. Likewise, the copper may be treated with nickel, tin, silver or some other protective finish.

The lower bracket 154 has a first end portion with first slots 158 formed therein and a second end portion with second slots 160 formed therein. A pair of first and second troughs 164, 166 are formed in the lower bracket 154 and extend across the width of the lower bracket 154. The first and second troughs 164, 166 have arcuate cross-sections and are disposed toward first and second end portions of the lower bracket 154, respectively. In-between the first and second troughs 164, 166 a linear series of spaced-apart first openings 170 and a linear series of spaced-apart second openings 172 are formed in the lower bracket 154. The two series are spaced apart, with the series of first openings 170 being disposed toward the first trough 164 and the series of second openings 172 being disposed toward the second trough 166. A first notch 174, a pair of middle notches 176 and a second notch 178 are formed in each side of the lower bracket 154.

The holding frames 66, with the contact rows 65 mounted thereto, are disposed over, and secured to, the lower bracket 154 to thereby form a contact assembly 155. Bottom portions of the contact rows 65 are disposed in the first and second troughs 164, 166, respectively, and engage surfaces defining them. The holding slots 72 of the holding frames 66 are aligned over the first and second troughs 164, 166, respectively, to permit each contact row 65 to be disposed in both a holding slot 72 and the first or second trough it is aligned therewith. For the holding frame **66*a* disposed over the first trough 164, the first fingers 74 of the holding frame 66*a* are secured in the first slots 158 of the lower bracket 154, while the second fingers 76 are secured in the first openings 170 of the lower bracket 154. A first edge of the lower bracket 154 is trapped behind the outrigger flange 79** of the holding frame 66*a*. For the holding frame 66*b* disposed over the second trough 166, the first fingers 74 of the holding frame 66*b* are secured in the second slots 160 of the lower bracket 154, while the second fingers 76 are secured in the second openings 172 of the lower bracket 154. A second edge of the lower bracket 154 is trapped behind the outrigger flange 79 of the holding frame 66*b*.

The upper bracket 152 includes a main body 184 having an inverted gull wing profile, as viewed from the side. A first flange 186 extends upwardly from a first end of the main body 184 and a second flange 188 extends upwardly from a second end of the main body 184. In a first direction, the main body 184 slopes downwardly from a center portion to a first bend 187 and then slopes upwardly to the first flange 186. In a second direction, the main body 184 slopes downwardly from the center portion to a second bend 189 and then slopes upwardly to the second flange 188. A series of first posts 190 and series of second posts 192 extend downwardly from the main body 184. The first and second posts 190, 192 may be formed from the main body 184 through cuts made in the main body 184 by stamping or otherwise. After the cuts are made, the first and second posts 190, 192 are bent downwardly. When the upper and lower brackets 152, 154 are secured together, the first posts 190 extend into the first openings 170 of the lower bracket 154 and the second posts extend into the second openings 172 of the lower bracket 154.

On each side of the main body 184, a pair of spaced-apart legs 196 bracket the center portion of the main body 184 and extend downwardly. Also, on each side of the main body 184, latches 200 are joined to the main body 184, one of which is disposed toward the first end of the main body 184 and the other one being disposed toward the second end of the main body 184. A downwardly-extending mounting tab 204 is joined to each latch 200. The latches 200 each include an outwardly-extending main member 208 joined at a bend to an inwardly-sloping engagement member 210. The engagement member 210 is resiliently movable toward the main member 208.

The upper bracket 152 is secured to the contact assembly 155 by the legs 196 and the mounting tabs 204 of the upper bracket 152. More specifically, notched lower ends of the mounting tabs 204 of the upper bracket 152 are held in the first and second notches 174, 178 of the lower bracket 154, respectively, and notched lower ends of the legs 196 of the upper bracket 152 are held in the middle notches 176 of the lower bracket 154, respectively. The upper and lower brackets 152, 154 can be clinched or welded together. With the upper and lower brackets 152, 154 so connected, first and second chambers 214, 216 are formed between the upper and lower brackets 152, 154. The first and second chambers 214, 216 are aligned with each other. Access to the first chamber 214 is provided by an access opening disposed at the first end of the third coupler 150, while access to the second chamber 216 is provided by an access opening disposed at the second end of the third coupler 150. The first chamber 214 is inwardly delimited by the first posts 190, while the second chamber 216 is inwardly delimited by the second posts 192. The holding frame 66*a* (with a contact row 65 mounted thereto) is disposed in the first chamber 214. The first chamber 214 is narrowed by the first bend 187 of the main body 88, where the contact row 65 is located. The holding frame 66*b* (with a contact row 65 mounted thereto) is disposed in the second chamber 216. The second chamber 216 is narrowed by the second bend 189 of the main body 184, where the contact row 65 is located.

In sum, the third coupler 150 has a first mounting section 215 that includes the first chamber 214, with a contact row 65 mounted therein, and a second mounting section 217 that includes the second chamber 216, with a contact row 65 mounted therein. The first and second mounting sections 215, 217 are aligned in the direction between the upper and lower brackets 152, 154 and in the direction of the width of the upper and lower brackets 152, 154. The first and second mounting sections 215, 217, however, are oppositely directed, i.e., the openings of the first and second chambers 214, 216 are oppositely directed.

Figure 11:
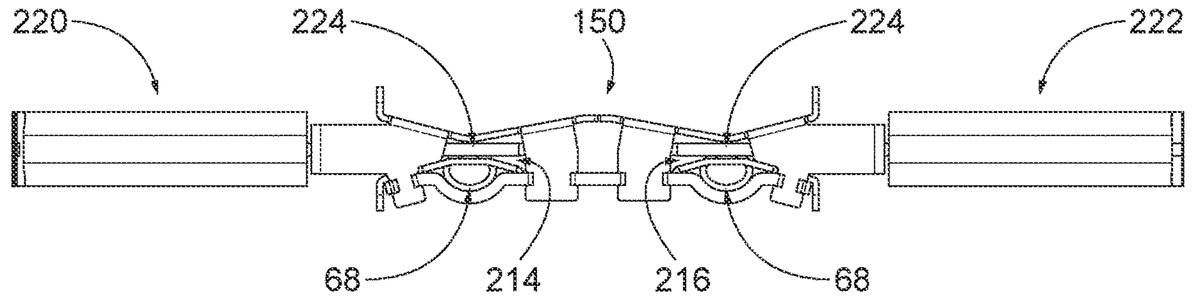
FIG. 11 shows a side elevational view of the third coupler shown in FIG. 8, connecting together a pair of bus bars.
Figure 12:
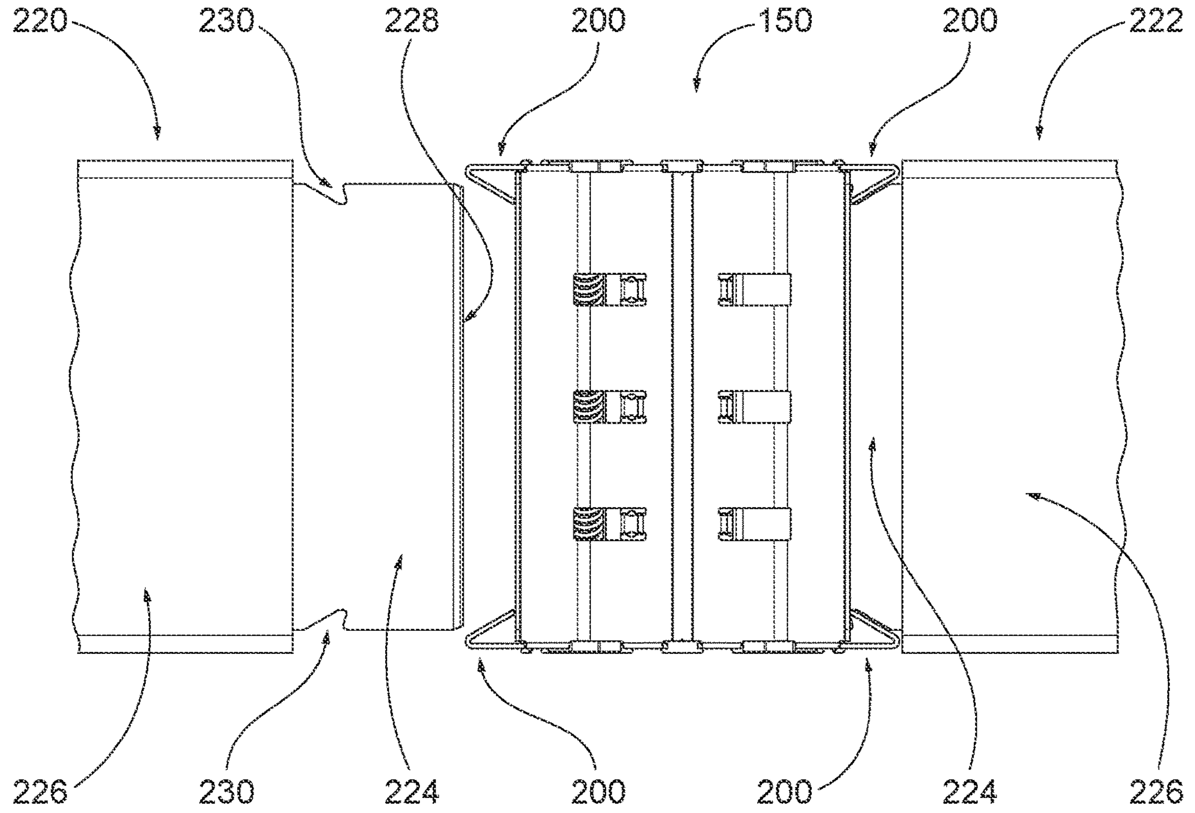
FIG. 12 shows a top plan view of the third coupler shown in FIG. 8 connecting together a pair of bus bars.

Referring now to FIGS. 11-12, the third coupler 150 is shown being used to connect together first and second bus bars 220, 222, each of which has a metallic conductor 224 encased within an outer polymeric sheath 226. End portions of the conductors 224 are exposed and include a tapered front edge 228 and opposing side edges with notches 230 formed therein. As shown in FIG. 12, the second bus bar 222 is already mounted to the third coupler 150, with the end portion of its conductor 224 being disposed in the second chamber 216 and the tapered front edge 228 being in engagement with, or in close proximity to, the second posts 192. The first bus bar 220 is spaced from the first end of the third coupler 150. To mount the first bus bar 220 to the third coupler 150, the first bus bar 220 is moved toward the opening in the first chamber 214. The moving tapered end 224 of the conductor 224 engages the engagement members 210 of the latches 206, pushing them outward toward the main members 208. The outward movement of the engagement members 210 allows the end portion of the conductor 224 to enter the first chamber 214 until the tapered end 22 engages, or is in close proximity to, the first posts 190. At this point, the engagement members 210 resiliently move inward, away from the main members 208 and into the notches 230, where they become trapped. The entrapment of the engagement members 210 of the third coupler 150 in the notches 230 of the first and second bus bars 220, 222 releasably secures the first and second bus bars 220, 222 to the third coupler 150.

When the third coupler 150 is fully connected to the first and second bus bars 220, 222, the coil contacts 68 in the contact rows 65 press against lower planar surfaces of the conductors 224 of the first and second bus bars 220, 222, respectively, as well as an interior surface of the lower bracket 154 in the first and second troughs 164, 166. In addition, upper planar surfaces of the conductors 224 press against an interior surface of the upper bracket 154. In this manner, the coil contacts 68 and the upper and lower brackets 152, 154 electrically connect together the first and second bus bars 220, 222. Physically, the first and second bus bars 220, 222 are aligned so as to extend in the same direction. If the first and second bus bars 220, 222 have the same dimensions (e.g., thickness), their opposing planar surfaces may be substantially coplanar.

Figure 13:
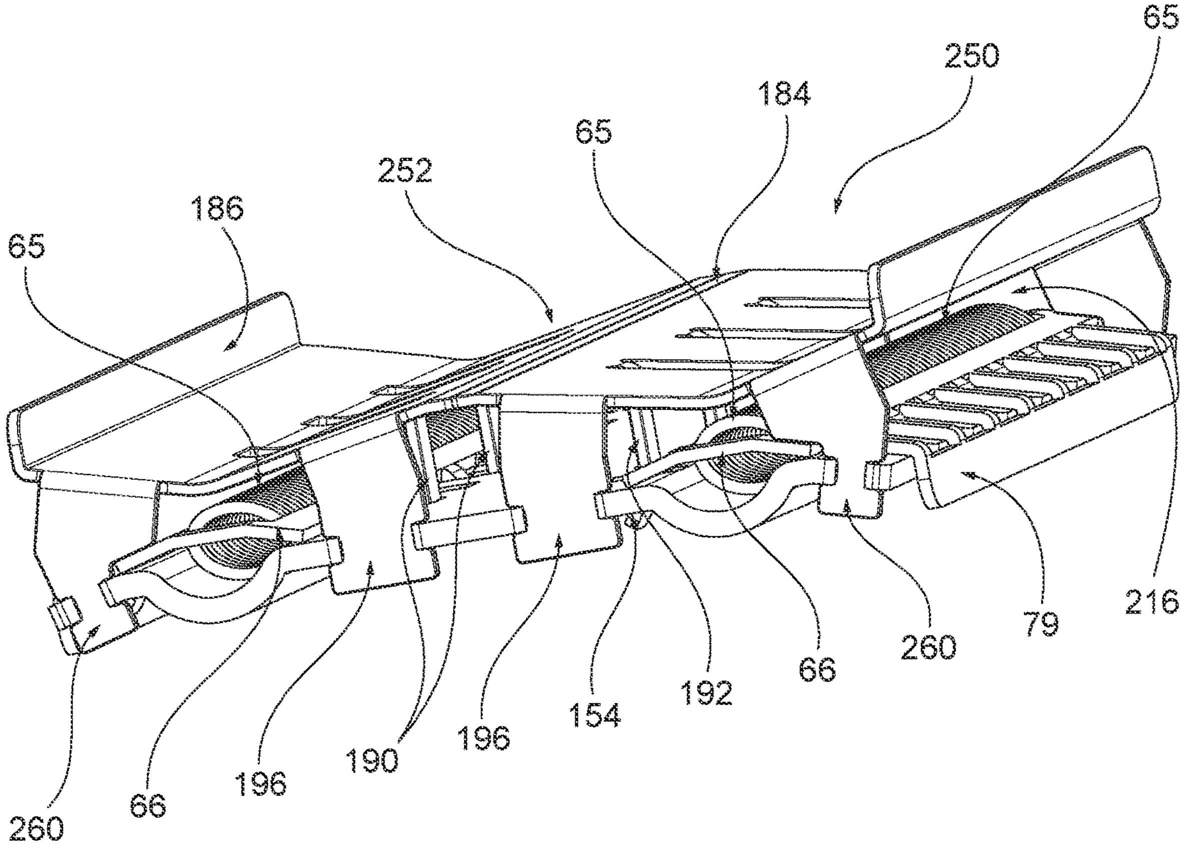
FIG. 13 shows a side perspective view of a fourth coupler constructed in accordance with a fourth embodiment of the present disclosure.
Figure 14:
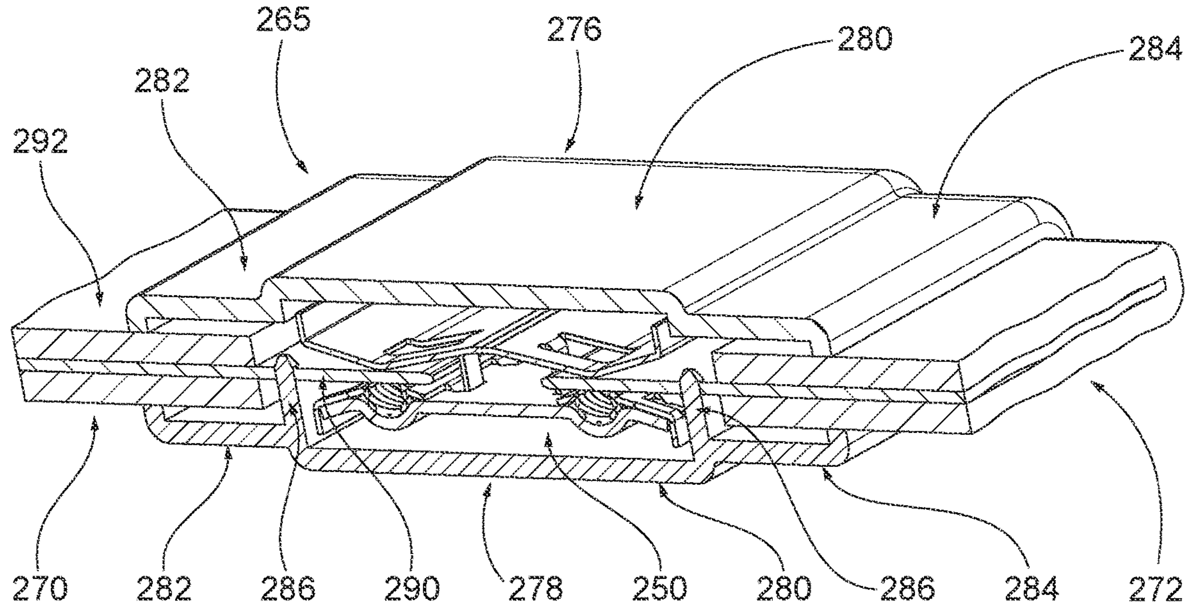
FIG. 14 shows a sectional side perspective view of the fourth coupler shown in FIG. 13 connecting together a pair of bus bars, wherein a latching assembly fastens the fourth coupler to the bus bars.
Figure 15:
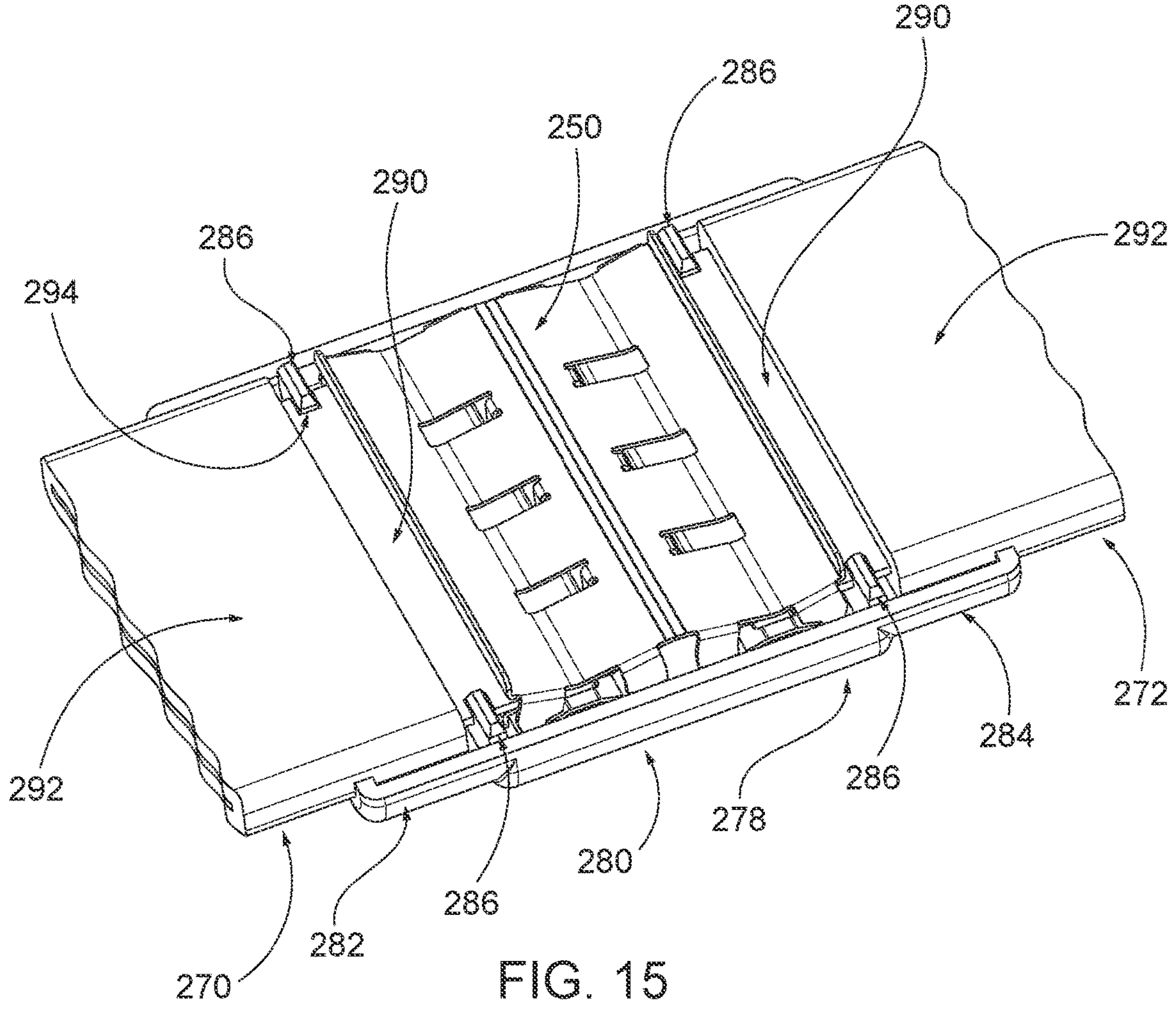
FIG. 15 shows a top perspective view of the fourth coupler connecting together the bus bars, wherein an upper shell of the latching assembly is removed.
Figure 16:
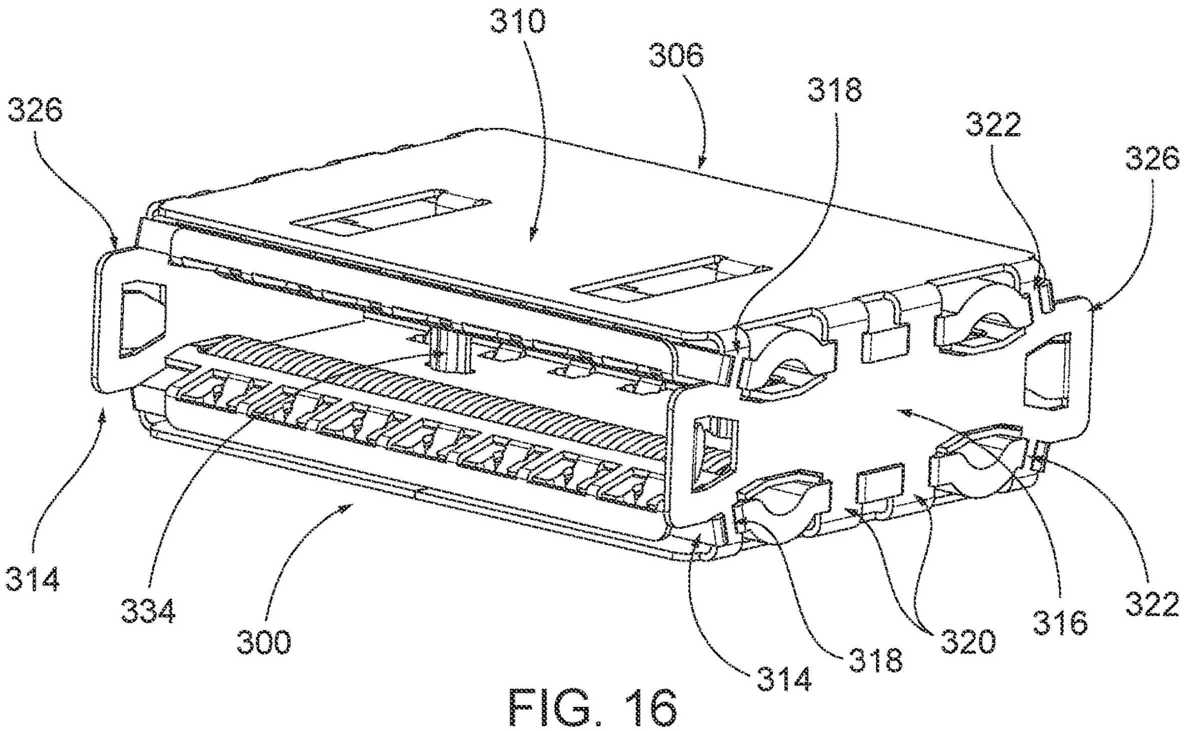
FIG. 16 shows a front perspective view of a fifth coupler constructed in accordance with a fifth embodiment of the present disclosure.
Figure 17:
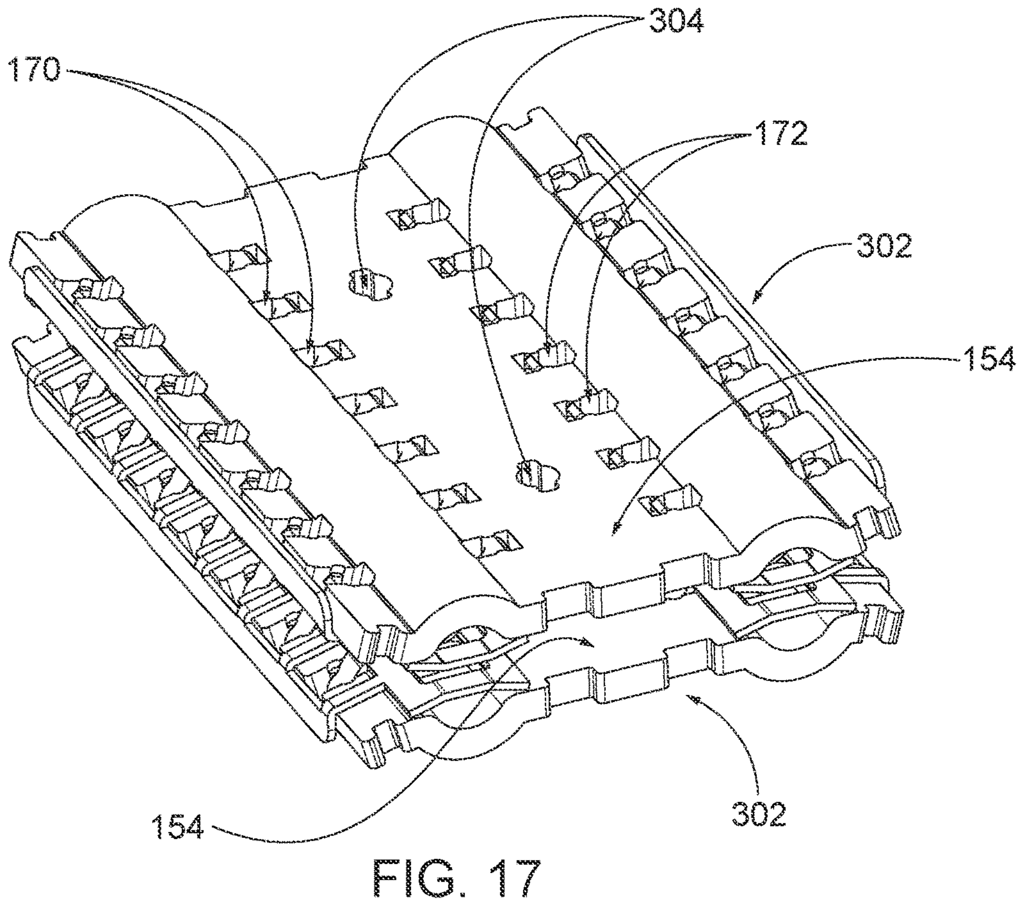
FIG. 17 shows a top side perspective view of a pair of contact assemblies of the fifth coupler shown in FIG. 16.

Referring now to FIGS. 13-15, there is shown a fourth coupler 250 constructed in accordance with a fourth embodiment of this disclosure. The fourth coupler 250 has the same construction and operation as the third coupler 150, except for the differences described below.

The fourth coupler 250 has an upper bracket 252 instead of the upper bracket 152. The upper bracket 252 has the same construction as the upper bracket 152, except the upper bracket 252 does not have the latches 200 and the mounting tabs 204. Instead, the upper bracket 252 has legs 260 with notched lower ends that are held in the first and second notches 174, 178 of the lower bracket 154, respectively.

With particular reference now to FIGS. 14-15, the fourth coupler 250 may be used with a latch assembly 265 to connect together first and second bus bars 270, 272. The latch assembly 265 includes an upper shell 276 that is fastened to a lower shell 278 by snap-fit connections. The upper and lower shells 276, 278 are each comprised of electrically insulating plastic and include a raised center section 280 disposed between first and second channel sections 282, 284. Together, the two center sections 280 cover the fourth coupler 250. Similarly, the first channel sections 282 together cover a portion of the first bus bar 270, while the second channel sections 284 together cover a portion of the second bus bar 272. Open ends of the first and second channel sections 282, 284 may be each be provided with inwardly-extending flanges for contacting or being in close proximity to the first bus bar 270 or the second bus bar 272, as the case may be. The lower shell 278 includes a plurality of upwardly-extending tabs 286. A first pair of the tabs 286 are located at the juncture between the first channel section 282 and the center section 280, on opposite sides of the lower shell 276, while a second pair of the tabs 286 are located at the juncture between the second channel section 284 and the center section 280, on opposite sides of the lower shell 276.

The first and second bus bars 270, 272 each have a metallic conductor 290 encased within an outer polymeric sheath 292. End portions of the conductors 290 are exposed and include a tapered front edge and opposing side edges with notches 294 formed therein. The conductors 290 of the first and second bus bars 270, 272 are inserted into the first and second channel sections 282, 284 of the lower shell 278 such that the tabs 286 of the lower shell 278 extend through the notches 294 of the first and second bus bars 270, 272. The upper shell 276 is aligned above the lower shell 278 and then brought into engagement with the lower shell 278 to form snap-fit connections between the upper and lower shells 276, 278, thereby fastening them together.

The third and fourth couplers 150, 250 are adapted to have a small to medium size and to connect together small to medium size conductors. Even with their relatively small size, the third and fourth couplers 150, 250 may be used in applications carrying a substantial amount of current. For example, in one embodiment, a fourth coupler 250 may be constructed having a width (in the direction of the first and second troughs 164, 166) of 42 mm, a length (in the direction between the first and second ends) of 28.5 mm and a thickness (in the direction between the upper and lower brackets 152, 154) of 8 mm, and may carry an electrical current of up to 280 amps.

The third and fourth couplers 150, 250 are also especially adapted to connect together mis-aligned conductors. When conductive bars of the same dimensions are connected together by the coupler 150, 250 so as to be collinear, the conductive bars are parallel to center portions of the upper and lower brackets 152, 154. The coupler 150, 250, however, can accommodate conductive bars that are not parallel to the center portions. More specifically, the configuration of the first and second chambers 214, 216 and the positioning and resilient deformability of the coil contacts 68 permit a conductive bar to be inserted into the first chamber 214 or the second chamber 216 so as to be disposed at an acute angle to the center portion of the upper bracket 152 or the lower bracket 154, as the case may be. This permits conductive bars to be coupled together when they are positioned at an obtuse angle to each other (when the coupler 150, 250 is disposed horizontally). It also permits conductive bars to be coupled together when they are offset but in parallel planes (when the coupler 150, 250 is at an acute angle to the horizontal).

Referring now to FIGS. 16-19, there is shown a fifth coupler 300 constructed in accordance with a fifth embodiment of this disclosure. The fifth coupler 300 typically has larger dimensions than the first through fourth couplers 60, 134, 150, 250 and is adapted for use with larger power conductors carrying larger currents. For example, the fifth coupler 300 may be used in applications where conductors carrying electric current of up to 450 Amps are connected together.

The fifth coupler 300 has a pair of contact assemblies 302, each of which has the same construction as the contact assembly 155, except each contact assembly 302 has a pair of slots 304 extending through the second bracket 154. The slots 304 are disposed about midway between the series of spaced-apart first openings 170 and the series of spaced-apart second openings 172 and are spaced apart in the direction of the series of first and second openings 170, 172. The contact assemblies 302 are mounted in a housing 306.

The housing 306 includes top and bottom walls 310, 312 connected together by two side structures 314. Each side structure 314 includes a body 316 having a pair of oppositely-directed first legs 318 joined to the top and bottom walls 310, 312, respectively, two pairs of oppositely-directed middle legs 320 joined to the top and bottom walls 310, 312, respectively, and a pair of oppositely-directed second legs 322 joined to the top and bottom walls 310, 312, respectively, each of the foregoing being notched. The first legs 318 are held in the first notches 174 of the second brackets 154, respectively, the middle legs 320 are held in the middle notches 176 of the second brackets 154, respectively, and the second legs 322 are held in the second notches 178 of the second brackets 154, respectively.

Each body 316 of the side structures 314 further includes latches 326, one of which is disposed at a first end of the fifth coupler 300 and a second one of which is disposed at a second end of the fifth coupler 300. Each of the latches 326 has a frame 330 defining an opening and an inwardly-sloping engagement member 332 joined to the frame 330 and resiliently movable outward, toward and/or into the opening.

Posts 334 extend downwardly from the top wall 310 and pass through the slots 304, respectively, in the second bracket 154 of an upper one of the contact assemblies 302. The posts 334 also extend into the slots 304, respectively, of the second bracket 154 of a lower one of the contact assemblies 302. The posts 334 may be formed from the top wall 310 through cuts made in the top wall 310 by stamping or otherwise. After the cuts are made, the posts 334 are bent downwardly and may be inserted through/into the slots 304 during the mounting of the contact assemblies 302 to the housing 306. In this regard, it should be noted that the housing 306 may be formed (e.g., stamped) from a single piece of metal and then folded around the contact assemblies 302, with opposing ends of the metal piece being joined together (e.g. by welding) along a seam 336.

Figure 18:
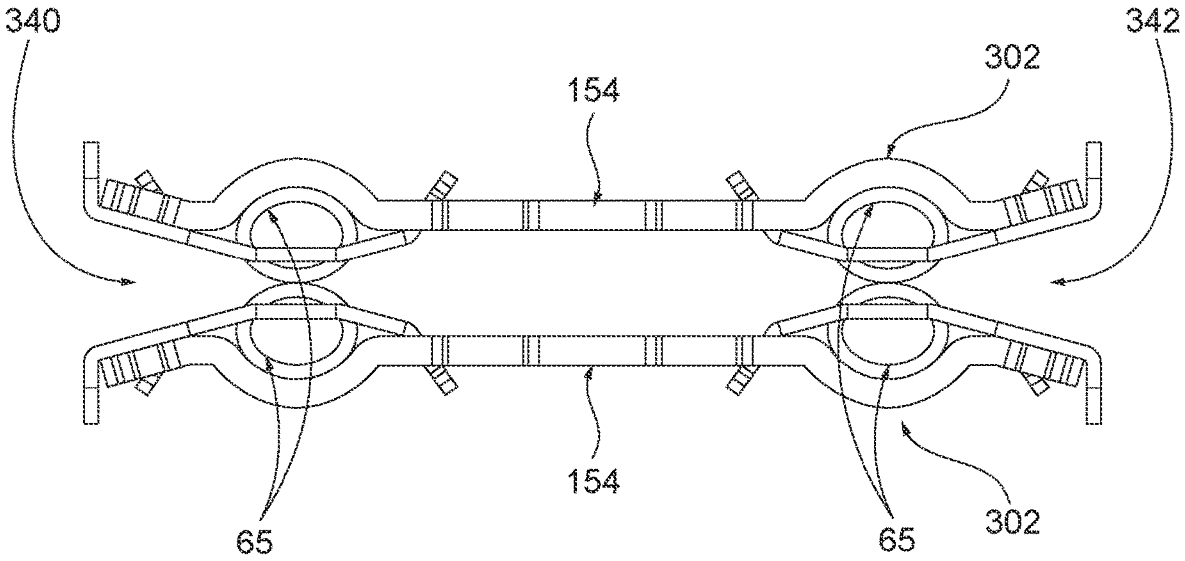
FIG. 18 shows a side elevational view of the pair of contact assemblies shown in FIG. 17.

The housing 306 holds the contact assemblies 302 such that the contact rows 65 of one contact assembly 302 are aligned with and face the contact rows of the other contact assembly 302. The contact assemblies 302 are separated so as to form first and second chambers 340, 342 in between. The first and second chambers 340, 342 are inwardly delimited by the posts 334. A pair of the aligned contact rows 65 is disposed in each of the first and second chambers 340, 342. As best shown in FIG. 18, the aligned contact rows 65 in each of the first and second chambers 340, 342 may be in physical contact with each other.

Figure 19:
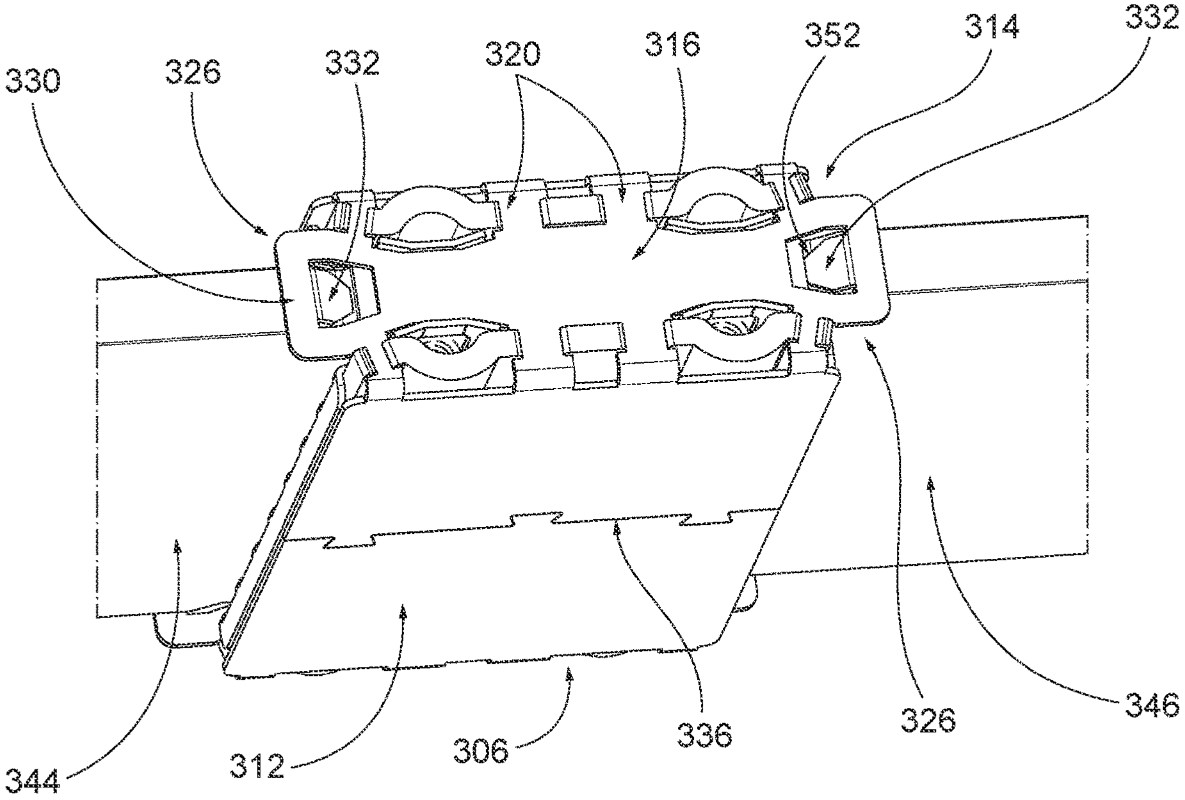
FIG. 19 shows a bottom perspective view of the fifth coupler of FIG. 16 connecting together a pair of bus bars.

Referring now to FIG. 19, the fifth coupler 300 is shown being used to connect together metallic first and second bus bars 344, 346. Although not shown, each of the first and second bus bars 344, 346 may be at least partially encased in an outer polymeric sheath. Opposing side edges of each of the first and second bus bars 344, 346 have notches 352 formed therein. As shown, the first and second bus bars 344, 346 are mounted to the fifth coupler 300, with their end portions being disposed in the first and second chambers 340, 342, respectively, and their tapered front edges being in engagement with, or in close proximity to, the posts 334. The engagement members 332 of the latches 326 are trapped in the notches 352 of the first and second bus bars 344, 346, thereby releasably securing the fifth coupler 300 to the first and second bus bars 344, 346.

When the fifth coupler 300 is fully connected to the first and second bus bars 344, 346, the coil contacts 68 in the aligned contact rows 65 in the first chamber 340 press against opposing planar surfaces of the first bus bar 344, and the coil contacts 68 in the aligned contact rows 65 in the second chamber 342 press against opposing planar surfaces of the second bus bar 346. The coil contacts 68 in the aligned contact rows 65 in the first chamber 340 also press against the second brackets 154 in their first troughs 164, and coil contacts 68 in the aligned contact rows 65 in the second chamber 342 also press against the second brackets 154 in their second troughs 166. In this manner, the pair of second brackets 154 electrically connect together the first and second bus bars 344, 346.

In other embodiments of the fifth coupler 300, the latches 326 may not be present. Instead, the fifth coupler 300 may be fastened to first and second bus bars using a latch assembly substantially similar to the latch assembly 265 used with the fourth coupler 250, described above.

Figure 20:
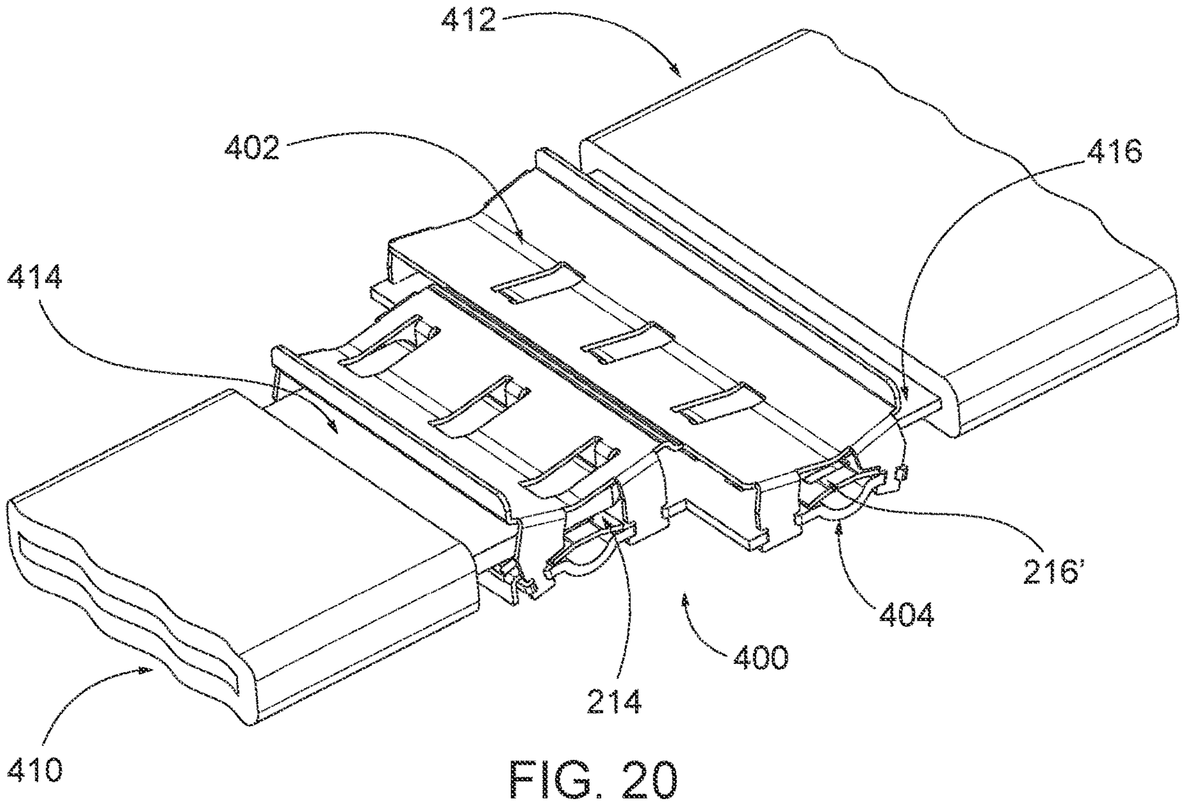
FIG. 20 shows a top perspective view of a sixth coupler constructed in accordance with a sixth embodiment of the present disclosure, wherein the sixth coupler is connecting together a pair of bus bars having different widths and/or thicknesses.
Figure 21:
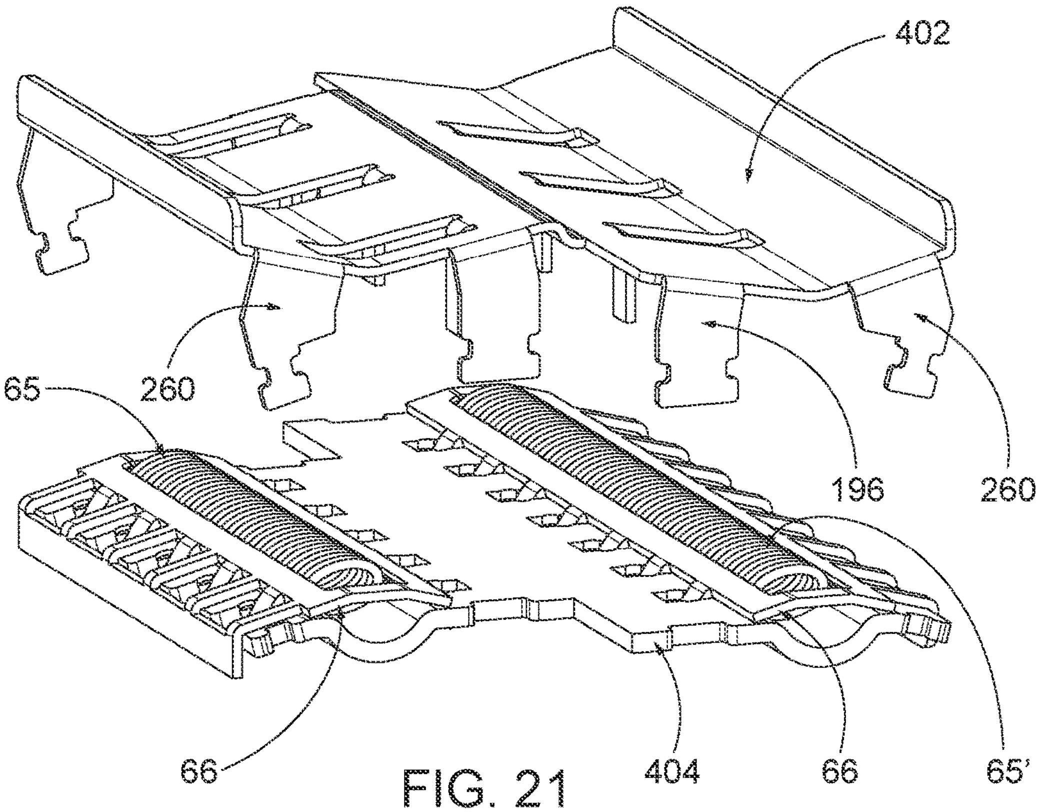
FIG. 21 shows an exploded side perspective view of upper and lower brackets of the sixth coupler of FIG. 20.

Referring now to FIGS. 20-21, there is shown a sixth coupler 400 constructed in accordance with a sixth embodiment of this disclosure. The sixth coupler 400 has the same construction as the fourth coupler 250, except for the differences described below.

The sixth coupler 400 has an upper bracket 402 instead of the upper bracket 252 and has a lower bracket 404 instead of the lower bracket 154. The lower bracket 404 has the same construction as the lower bracket 154, except the lower bracket 404 has a front section that is narrower than a posterior section. In connection therewith, the contact row 65 mounted to the front section is shorter than the contact row 65' mounted to the posterior section. The upper bracket 402 has the same construction as the upper bracket 252, except the upper bracket 402 has a front section that is narrower than a posterior section.

Since the front sections of the upper and lower brackets 402, 404 are narrower than the posterior sections of the upper and lower brackets 402, 404, the first chamber 214 is narrower than the second chamber 216'. This difference in widths permits the sixth coupler 400 to connect together two bus bars or other conductors having different widths and/or thicknesses. For example, in FIG. 20, the sixth coupler 400 is shown connecting together first and second bus bars 410, 412, wherein a conductor 414 of the first bus bar 410 is narrower than a conductor 416 of the second bus bar 412. The conductor 414 of the first bus bar 410 is disposed in the first chamber 214 and a planar bottom surface thereof engages the contact row 65 disposed therein, while the conductor 416 of the second bus bar 412 is disposed in the second chamber 216' and a planar bottom surface thereof engages the contact row 65' therein. In addition, upper planar surfaces of the conductors 414, 416 press against an interior surface of the upper bracket 402. In this manner, both the upper and lower brackets 402, 404 electrically connect together the first and second bus bars 410, 412.

Figure 22:
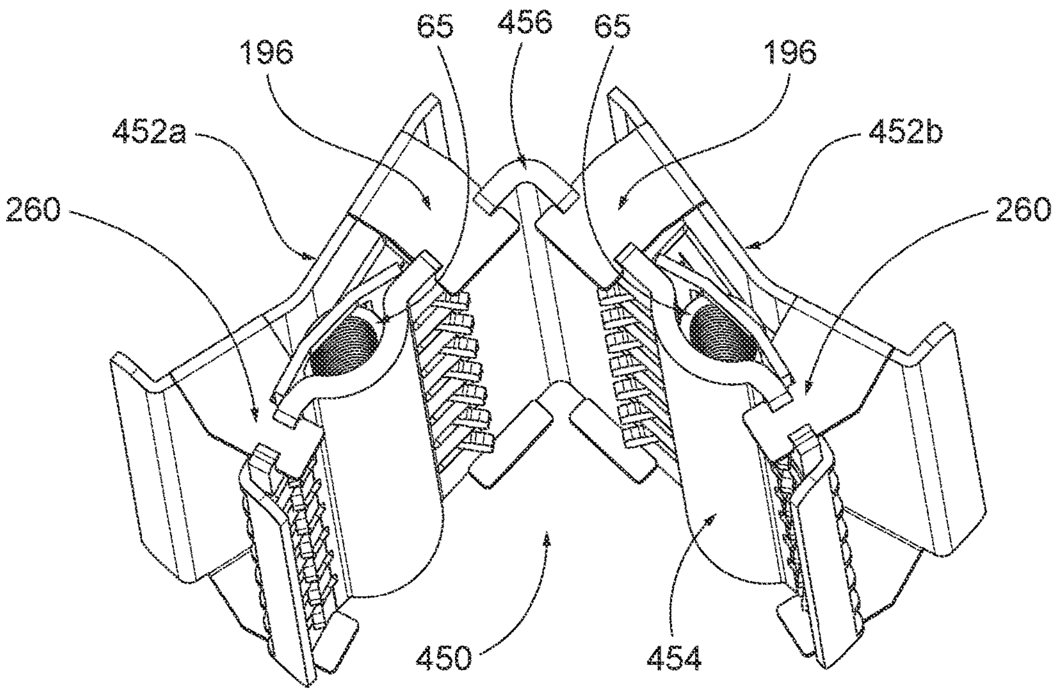
FIG. 22 shows a top side perspective view of a seventh coupler constructed in accordance with a seventh embodiment of the present disclosure.

Referring now to FIG. 22, there is shown a seventh coupler 450 constructed in accordance with a seventh embodiment of this disclosure. The seventh coupler 450 has the same construction as the fourth coupler 250, except for the differences described below.

The seventh coupler 450 has an upper bracket 452*a,b* instead of the upper bracket 252 and has a lower bracket 454 instead of the lower bracket 154. The lower bracket 454 has the same construction as the lower bracket 154, except the lower bracket 404 is bent at about a right angle along a bend 456 to have an L-shaped configuration. The upper bracket 452*a,b* has the same construction as the upper bracket 252, except the upper bracket is separated into two pieces, namely 452*a* and 452*b*.

The two pieces of the upper bracket 452*a,b* are secured to the lower bracket 454 to provide the seventh coupler 450 with an L-shaped configuration. The first and second chambers 214, 216 formed between the upper and lower brackets 452*a,b*, 454 are arranged at right angles to each other. As such, when bus bars are inserted into the first and second chambers 214, 216, respectively, the bus bars will be positioned at about a right angle to each other.

In other embodiments, a coupler similar to the fourth and seventh couplers 250, 450 may be provided wherein the coupler is bent at an angle other than 90°. Such a coupler may be bent to have an angle anywhere between 0° and 180°, such as 30°, 45° or 60°.

Figure 23:
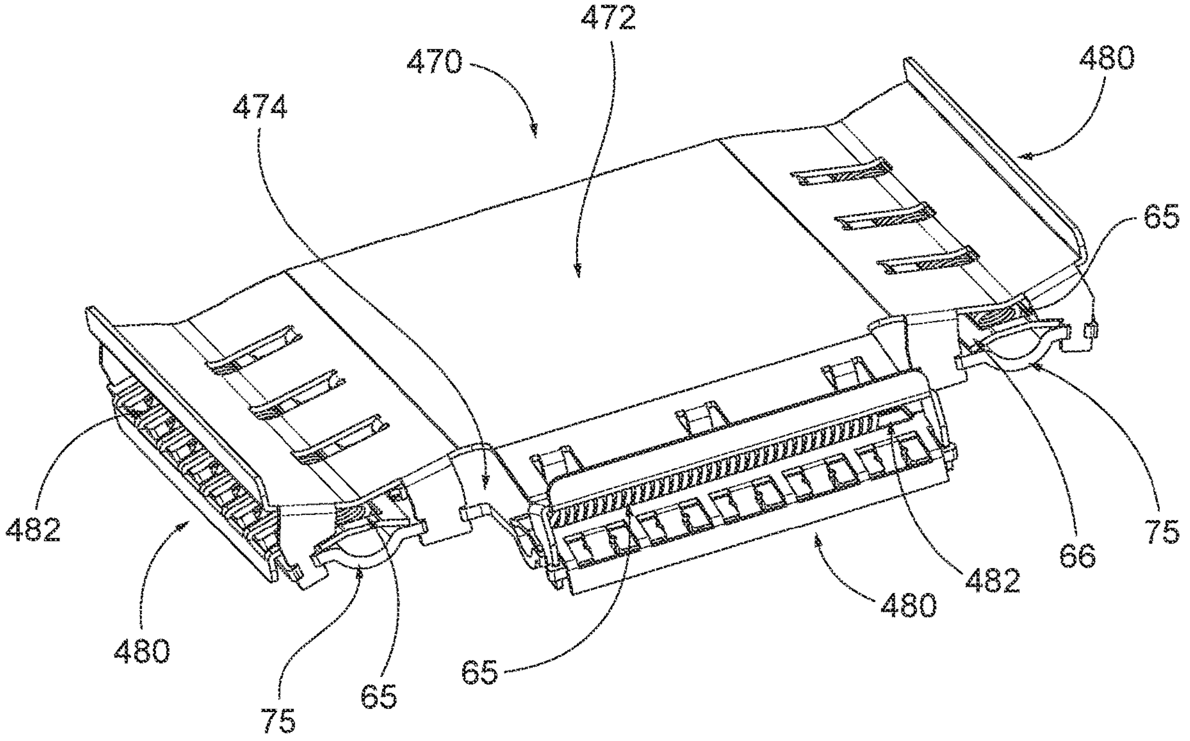
FIG. 23 shows a top perspective view of an eighth coupler constructed in accordance with an eighth embodiment of the present disclosure.

Referring now to FIG. 23, there is shown an eighth coupler 470 constructed in accordance with an eighth embodiment of this disclosure. The eighth coupler 470 has a metallic upper bracket 472 with a center portion joined to a plurality of mounting portions. Similarly, the eighth coupler 470 has a metallic lower bracket 474 with a center portion joined to a plurality of mounting portions. The upper and lower brackets 472, 474 are fastened together such that the mounting portions form a plurality of mounting sections 480 of the eighth coupler 470, respectively, each of which has a chamber 482 formed therein. Each chamber 482 is inwardly delimited by posts (not shown) extending downward from the mounting portion of the upper bracket 472 and has an outward opening through which a bar may be inserted. A holding frame 66, with a contact row 65 mounted thereto is disposed over, and secured to, each mounting portion of the lower bracket 474 in the chamber 482 of a mounting section 480. In each mounting section 480, bottom portions of the coil contacts 68 of a contact row 65 are disposed in a trough 75 that extends across the width of the mounting portion of the lower bracket 474.

In the embodiment shown in FIG. 23, the eighth coupler 470 has three mounting sections 480. Two of the mounting sections 480 are oppositely directed, i.e., their openings are oppositely-directed, while a third mounting section 480 is disposed at about a right angle to each of the other two mounting sections 480. When ends of metallic bars, such as power bus bars are disposed in the chambers 482, respectively, two of the bars are oppositely directed and a third one of the bars is disposed at about a right angle to each of the other two bars, thereby forming T-shaped configuration. The eighth coupler 470 electrically connects together the three bus bars.

It should be appreciated that in another embodiment, the coupler may only have two mounting sections 480 disposed at an angle to each other, which may be between 0° and 180°, such as 30°, 45° or 90°. In other embodiments, the coupler may have more than three mounting sections 480.

Although not shown, the second through eighth couplers 134, 150, 250, 300, 400, 450, 470 may each be mounted inside a plastic housing. The housing may have a multi-piece construction, such as having upper and lower shells that are snap-fit together and/or are welded together ultrasonically. The fourth coupler 250 is especially well-suited for mounting in a plastic housing, such as one formed from a pair of upper and lower shells. Such shells may each have a planar plate with flanges projecting from opposing sides thereof. The planar plate of the upper shell may further have opposing ends with upwardly extending lips. The fourth coupler 250 is disposed in the lower shell and then the upper shell is disposed over the fourth coupler and the flanges secured together so as to trap the lips of the upper shell between the first and second flanges 186, 188 of the fourth coupler 250.

Figure 24:
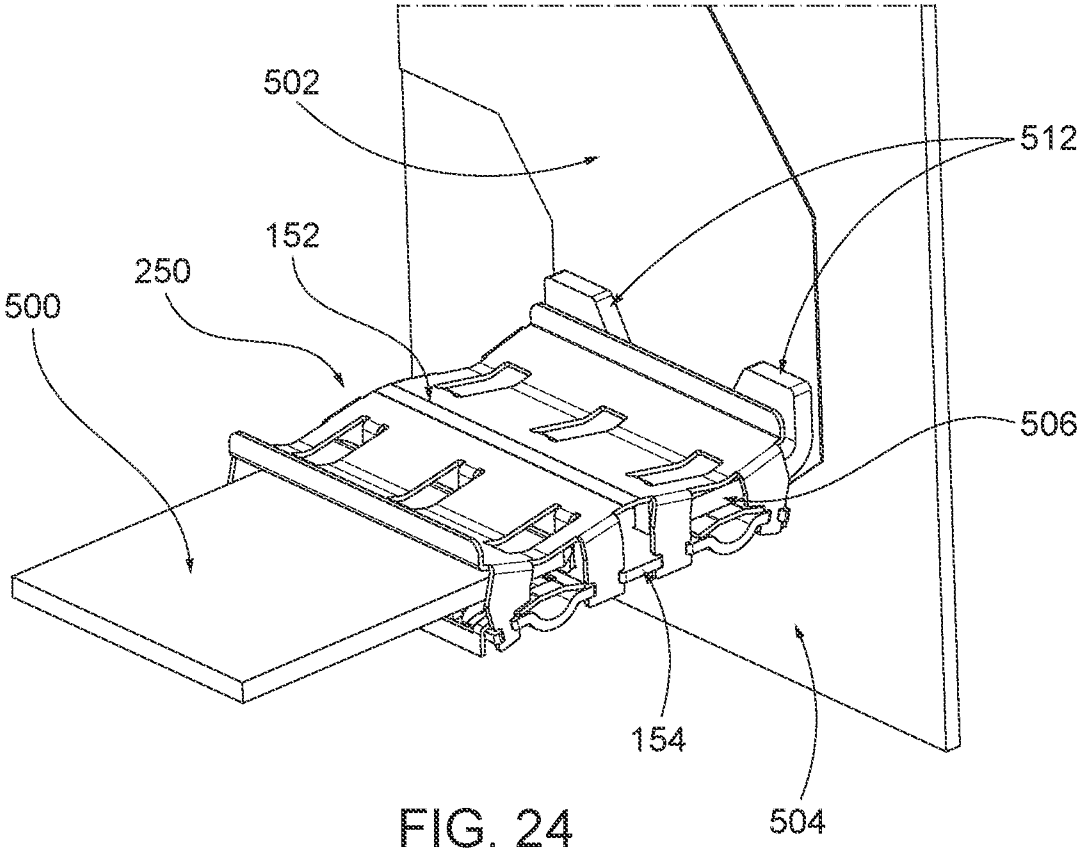
FIG. 24 shows a perspective view of the fourth coupler connecting a bus bar to a pad of a printed circuit board.
Figure 25:
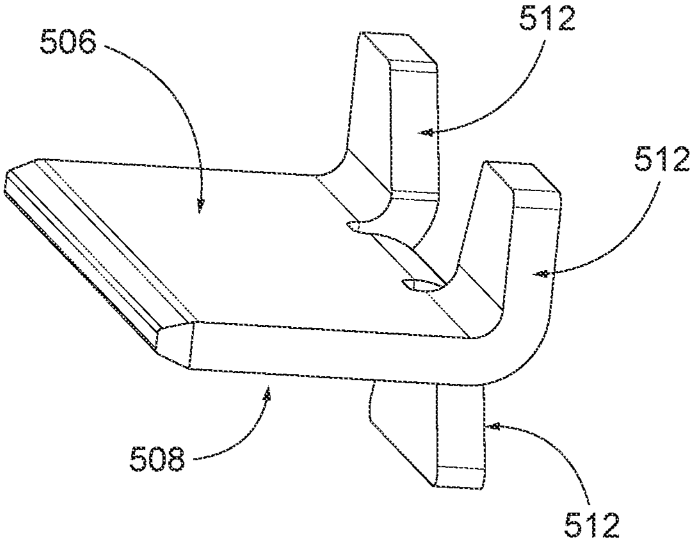
FIG. 25 shows a side perspective view of a connector having a blade mounted to the fourth coupler in FIG. 24 and legs secured to the pad of the printed circuit board.

In coupler embodiments described above, the couplers are described being used to connect together bus bars. It should be appreciated that these couplers may be used to connect together other structures and devices, such as printed circuit boards and components of electric motors, inverters and/or other electrical/electronic devices. For example, FIG. 24 shows the fourth coupler 250 being used to physically and electrically connect a bar 500, such as a power bus bar, to a metallic pad 502 of a printed circuit board 504. The bar 500 is disposed in the first chamber 214 and is in electrical contact with the fourth coupler 250 through the coil contacts 68 and the upper and lower brackets 152, 154. A blade 506 of a blade connector 508 (shown in FIG. 25) is disposed in the second chamber 216 and is in electrical contact with the fourth coupler 250 through the coil contacts 68 and the upper and lower brackets 152, 154. The blade connector 50 is made from a conductive metal, such as copper, a copper alloy or another electrically conductive metal.

In addition to the blade 506, the blade connector 508 includes a plurality of legs 512 joined at bends to the blade 506. At least two of the legs 512 are disposed on opposite sides of the blade 506 to provide better stability. The legs 512 have planar lower surfaces that are coplanar with each other and are disposed at about right angles to the opposing planar surfaces of the blade 506. The lower surfaces of the legs 512 are secured to the pad 502 of the printed circuit board 504, such as by soldering.

Figure 26:
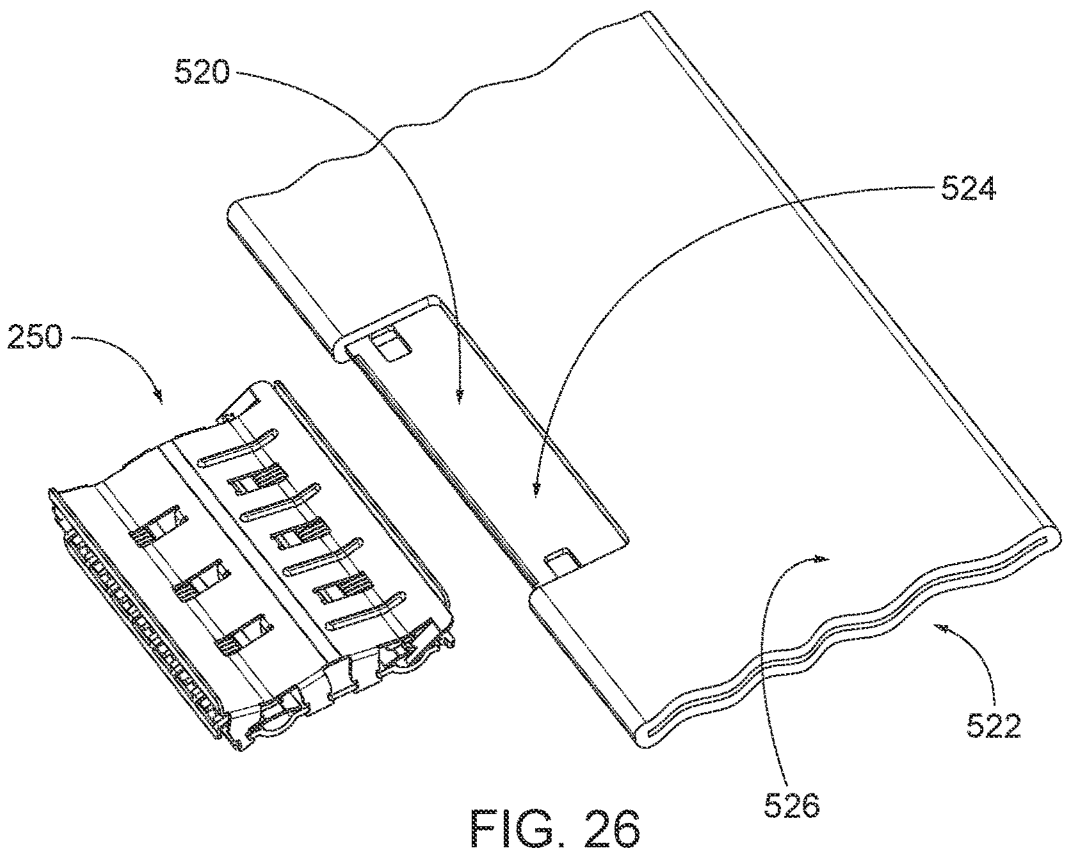
FIG. 26 shows a top perspective view of the fourth coupler in the process of being connected to a tap formed in a bar for conveying power.

Referring now to FIG. 26, the fourth coupler 250 is shown in the process of being physically and electrically connected to a tap 520 formed in a bar 522 for conveying power. The bar 522 is wide and includes a conductor 524 encased in an outer polymeric sheath 526. A rectangular side portion of the sheath 526 is removed to expose a rectangular portion of the conductor 522, which forms the tap 520. In order to mount the fourth coupler 250 to the bar 522, the tap 520 is disposed in the first chamber 214 of the fourth coupler 250 so as to be in physical and electrical contact with the fourth coupler 250 through the coil contacts 68 and the upper and lower brackets 152, 154.

Figure 27:
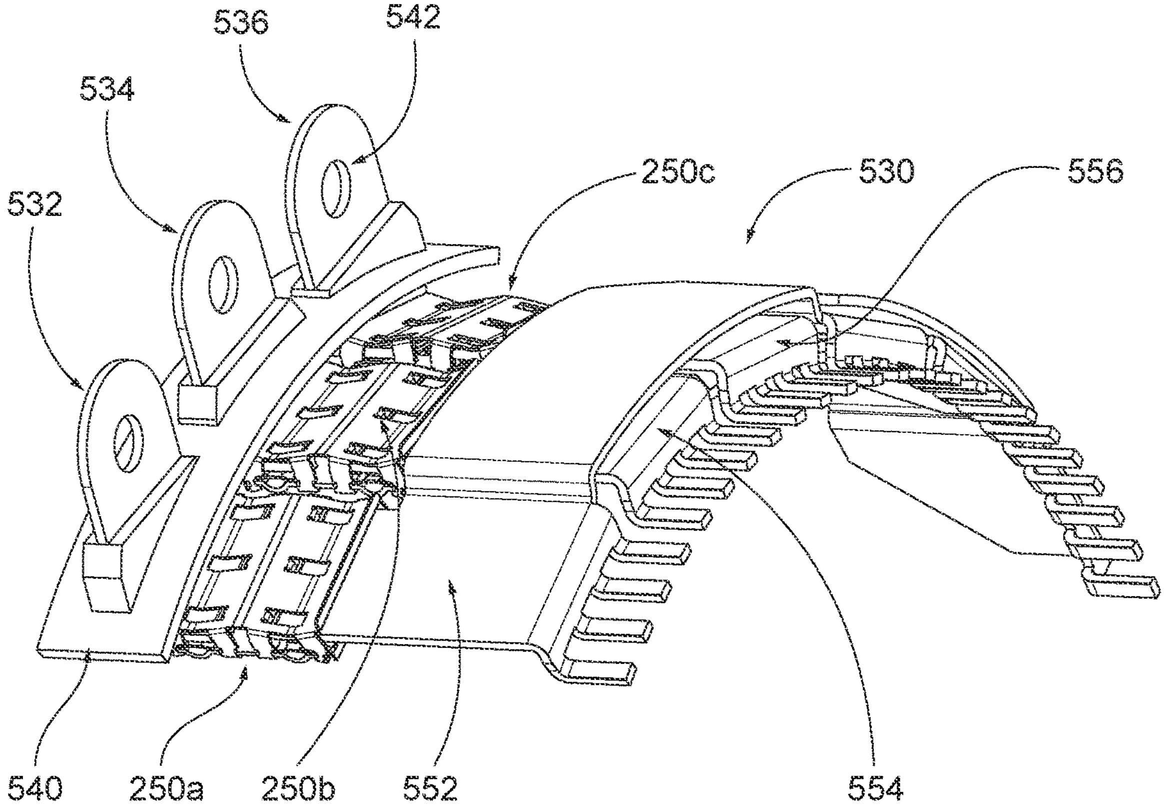
FIG. 27 shows a side perspective view of a portion of an electric motor having bus bars connected by fourth couplers to terminals.
Figure 28:
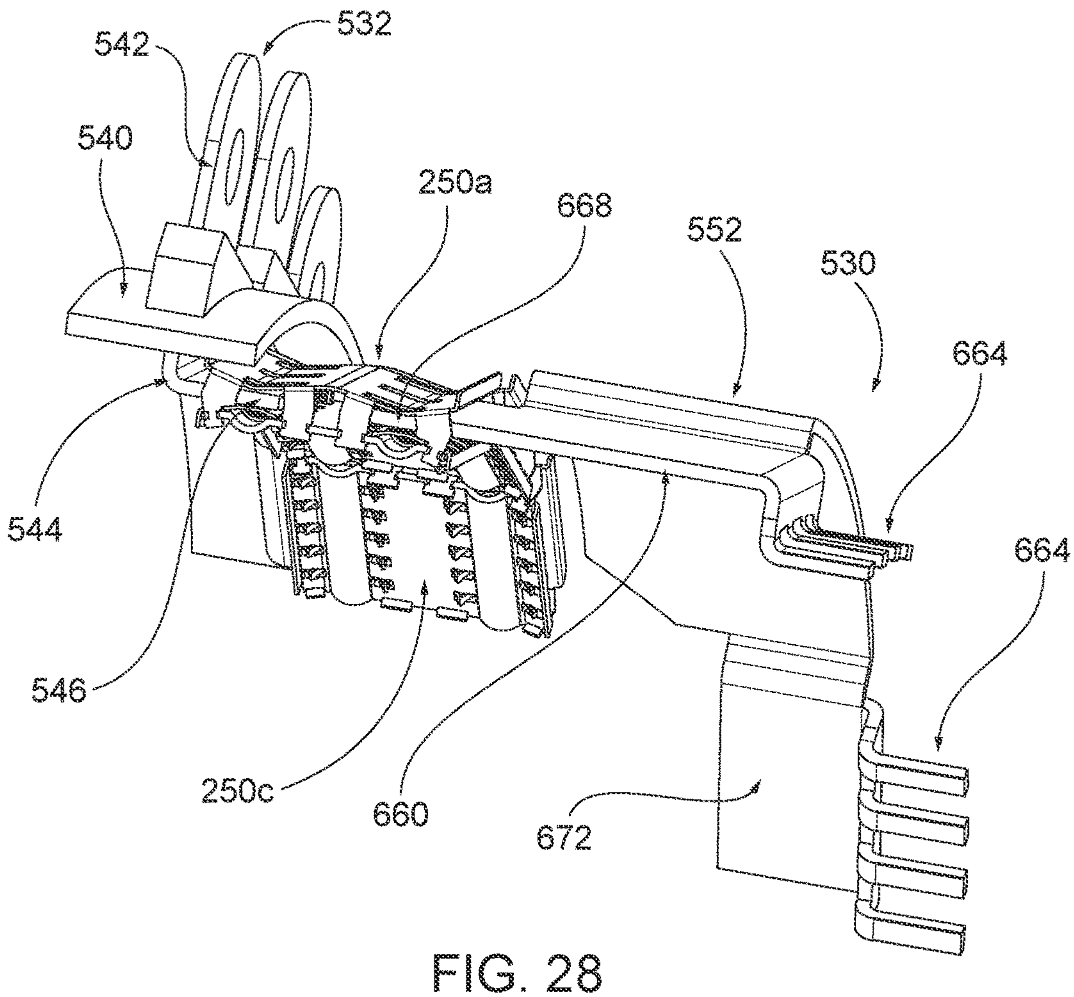
FIG. 28 shows a lower side perspective side view of the portion of the electric motor, wherein two of the bus bars have been removed.
Figure 29:
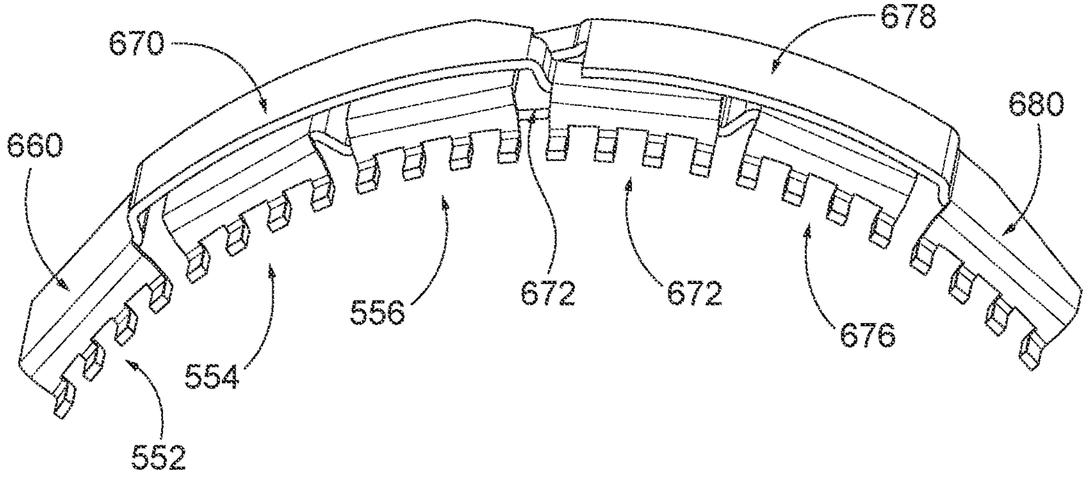
FIG. 29 shows a front perspective view of the bus bars shown in FIG. 27.
Figure 30:
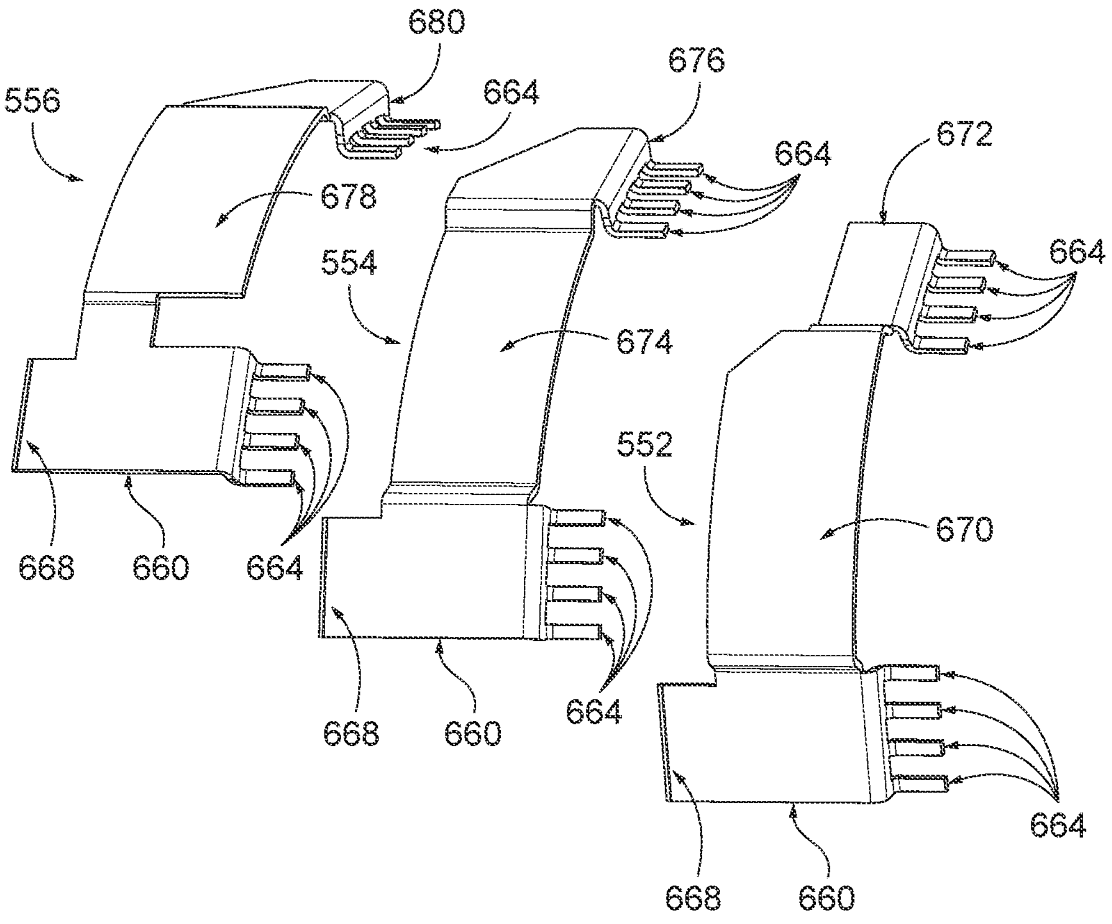
FIG. 30 shows a side perspective view of the bus bars shown in FIG. 29, wherein the bus bars are spaced apart.

Referring now to FIGS. 27-29, a plurality of fourth couplers 250 are shown connecting together components of an electric motor 530 (only a portion of which is shown). The motor 530 has first, second and third terminals 532, 534, 536 for connection to three phases of a power source, respectively. The terminals 532, 534, 536 may be mounted to a plastic mounting ring 540. Each of the terminals 532, 534, 536 may include a mounting lug 542 joined at a bend 544 to a blade 546.

The first terminal 532 is physically and electrically connected to a first bus bar 552, the second terminal 534 is physically and electrically connected to a second bus bar 554 and the third terminal 536 is physically and electrically connected to a third bus bar 556. Each of the bus bars 552, 554, 556 is a unitary or monolithic structure and has a base section 660 connected by a bridge section to at least one satellite section. The base sections 660 and the satellite sections each have fingers 664 extending therefrom. Although not shown, the fingers 664 are secured, such as through welding, to wires of a stator winding. Each main base section 660 has a rearwardly-extending blade portion 668 with opposing planar surfaces and a tapered front edge.

The first, second and third terminals 532, 534, 536 are connected to the first, second and third bus bars 552, 554, 556, respectively, by the fourth couplers 250*a,b,c*, respectively. The blades 546 of the first, second and third terminals 532, 534, 536 are disposed in the first chambers 214 of the fourth couplers 250*a,b,c*, respectively, while the blade portions 668 of the first, second and third bus bars 552, 554, 556 are disposed in the second chambers 216 of the fourth couplers 250*a,b,c*, respectively. Inside each fourth coupler 250*a,b,c*, coil contacts 68 inside the first chamber 214 press against a lower planar surface of a blade 546, with the upper planar surface of the blade 546 being pressed against the upper bracket 152. In addition, coil contacts 68 inside the second chamber 216 press against a lower planar surface of a blade portion 668, with the upper planar surface of the blade portion 668 being pressed against the upper bracket 152.

The first, second and third bus bars 552, 554, 556 are configured to be overlapping and interleaved with each other. The first bus bar 552 has a bridge section 670 that is connected by pronounced upward bends between the base section 660 and a satellite section 672. In contrast, the second bus bar 554 has a bridge section 674 that is connected by pronounced downward bends between the base section 660 and a satellite section 676. The third bus bar 556 has a bridge section 678 that is connected by slight upward bends between the base section 660 and a satellite section 680.

The foregoing configurations of the first, second and third bus bars 552, 554, 556 allows them to be arranged such that the base sections 660 and the satellite sections 672, 676, 680 are aligned along a cylinder circumscribed by components of the motor 530. More specifically, the blade portions 668 of the base sections 660 are aligned along an arc that forms part of the cylinder, i.e., the blade portions 668 are radially aligned. The fingers 664 of the base sections 660 and the satellite sections 672, 676, 680 are also aligned along an arc that forms part of the cylinder, i.e., the fingers 664 are radially aligned. In addition, the bridge section 670 of the first bus bar 552 extends over the base sections 660 of the second and third bus bars 554, 556; the bridge section 674 of the second bus bar 554 extends under both the base section 660 of the third bus bar 556 and the satellite section 672 of the first bus bar 552; and the bridge section 678 of the third bus bar 556 extends over the satellite sections.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A coupler for connecting to at least one power conductor, the coupler comprising:

a first bracket and a second bracket that are arranged to define in between a chamber for receiving the at least one power conductor, the second bracket having a trough formed therein that extends across at least a portion of the width of the chamber; and a row of canted coil contacts secured to the second bracket so as to be partially disposed in the trough and project outwardly therefrom into the chamber; and a frame having a body with a holding slot formed therein and a plurality of fingers extending therefrom;

wherein the frame is disposed over the second bracket such that the holding slot is aligned with the trough;

wherein the row of canted coil contacts is at least partially disposed in the holding slot; and wherein the second bracket has a plurality of fastening slots, the fingers of the frame being held in the fastening slots, respectively, thereby securing the frame to the second bracket.

2. The coupler of claim 1, wherein the first bracket has a bend aligned with the trough, the bend narrowing the chamber above the row of canted coil contacts.

3. A power connector assembly comprising the coupler of claim 1, wherein the at least one power conductor comprises a first power conductor and a second power conductor, wherein the second power conductor is at least partially disposed in the chamber between the first and second brackets and is in contact with the row of canted coil contacts; and a wherein the first power conductor is electrically connected to the second power conductor through the coupler.

4. The power connector assembly of claim 3, wherein the row comprises a unitary coil having a plurality of the canted coil contacts.

5. A power connector assembly comprising:

a first power conductor and a second power conductor;

a coupler that comprises:

a first bracket and a second bracket that are arranged to define in between a chamber for receiving the second power conductor, the second bracket having a trough formed therein that extends across at least a portion of the width of the chamber; and a row of canted coil contacts secured to the second bracket so as to be partially disposed in the trough and project outwardly therefrom into the chamber;

wherein the second power conductor is at least partially disposed in the chamber of the coupler between the first and second brackets and is in contact with the row of canted coil contacts, and wherein the first power conductor is electrically connected to the second power conductor through the coupler; and wherein the second bracket has an end with teeth formed therein, and wherein the first power conductor has a portion configured to engage the teeth of the second bracket to physically secure the first power conductor to the second bracket.

6. The power connector assembly of claim 5, wherein the first power conductor is part of a cable, and wherein the power connector assembly further includes a plastic housing enclosing the coupler.

7. The power connector assembly of claim 6, wherein the second power conductor has a front edge portion with a plurality of press-fit fasteners extending therefrom.

8. The coupler of claim 1, wherein the chamber is a first chamber and the first and second brackets define a second chamber in-between, wherein the trough is a first trough and wherein the second bracket has a second trough formed therein that extends across at least a portion of the width of the second chamber, and wherein the row of canted coil contacts is a first row of canted coil contacts and the coupler further comprises a second row of canted coil contacts secured to the second bracket so as to be partially disposed in the second trough and project outwardly therefrom into the second chamber.

9. The coupler of claim 8, wherein the coupler has a first access opening for providing access to the first chamber and a second access opening for providing access to the second chamber, wherein the first chamber is inwardly delimited by one or more first posts extending between the first and second brackets, and wherein the second chamber is inwardly delimited by one or more second posts extending between the first and second brackets.

10. The coupler of claim 8, wherein the first bracket has first and second bends aligned with the first and second troughs, respectively;

wherein the first bend narrows the first chamber above the first row of canted coil contacts; and wherein the second bend narrows the second chamber above the second row of canted coil contacts.

11. The coupler of claim 9, wherein the first access opening is disposed at about a right angle to the second access opening.

12. A power connector assembly comprising the coupler of claim 8, and further comprising:

a first power conductor at least partially disposed in the first chamber between the first and second brackets and contacting the first row of canted coil contacts; and a second power conductor at least partially disposed in the second chamber between the first and second brackets and contacting the second row of canted coil contacts.

13. The power connector assembly of claim 12, wherein the first and second power conductors comprise first and second bus bars, respectively, that extend in opposite directions; and wherein the power connector assembly further comprises a latch assembly that is connected to the coupler and engages the first and second bus bars to fasten the first and second bus bars to the coupler.

14. The power connector assembly of claim 13, wherein the latch assembly comprises latches integrally joined to one or both of the first and second brackets that releasably engage notches in the first and second bus bars.

15. The power connector assembly of claim 13, wherein the latch assembly comprises polymeric first and second shells that are fastened to each other and enclose the coupler and portions of the first and second bus bars, one or both of the first and second shells having projecting tabs that engage notches in the first and second bus bars.

16. The power connector assembly of claim 12, wherein the second power conductor comprises a connector having a blade joined to a plurality of legs with lower surfaces disposed at about right angles to opposing surfaces of the blade;

wherein the blade is disposed in the second chamber between the first and second brackets and contacts the second row of canted coil contacts; and wherein the first power conductor comprises a bus bar having an end portion disposed in the first chamber between the first and second brackets and contacting the first row of canted coil contacts.

17. An assembly comprising the power connector assembly of claim 16 and a printed circuit board having a metallic pad, wherein the lower surfaces of the legs of the connector are secured to the metallic pad of the printed circuit board.

18. A power connector assembly comprising:

a coupler that comprises:

a first bracket and a second bracket that are arranged to define a first chamber and a second chamber in-between, the first bracket having a first trough that extends across at least a portion of the width of the first chamber and a second trough that extends across at least a portion of the width of the second chamber, and the second bracket having a third trough that extends across at least a portion of the width of the first chamber and a fourth trough that extends across at least a portion of the width of the second chamber;

a first row of canted coil contacts secured to the first bracket so as to be partially disposed in the first trough and project outwardly therefrom;

a second row of canted coil contacts secured to the first bracket so as to be partially disposed in the second trough and project outwardly therefrom;

a third row of canted coil contacts secured to the second bracket so as to be partially disposed in the third trough and project outwardly therefrom;

a fourth row of canted coil contacts secured to the second bracket so as to be partially disposed in the fourth trough and project outwardly therefrom;

a housing in which the first bracket and the second bracket are mounted, wherein the third row of canted coil contacts is aligned with the first row of canted coil contacts, and the fourth row of canted coil contacts is aligned with the second row of canted coil contacts;

a first power conductor at least partially disposed in the first chamber of the coupler between the first bracket and the second bracket and contacting the first row of canted coil contacts and the third row of canted coil contacts; and a second power conductor at least partially disposed in the second chamber of the coupler between the first bracket and the second bracket and contacting the second row of canted coil contacts and the fourth row of canted coil contacts; and wherein the housing of the coupler includes a plurality of first latches for engaging the first power conductor and a plurality of second latches for engaging the second power conductor.

* * * * *